US012129578B2

(12) United States Patent
Aceves Tinajero et al.

(10) Patent No.: US 12,129,578 B2
(45) Date of Patent: *Oct. 29, 2024

(54) MULTIPLE LAYER KNITTED COMPONENTS HAVING MULTI-BED AREA

(71) Applicant: NIKE, Inc., Beaverton, OR (US)

(72) Inventors: Juan L Aceves Tinajero, Beaverton, OR (US); Nicola A. Danby, London (GB); Fiona L. Lesecq, London (GB); David F. Roth, Beaverton, OR (US); Gagandeep Singh, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,913

(22) Filed: Aug. 29, 2023

(65) Prior Publication Data

US 2023/0399776 A1     Dec. 14, 2023

Related U.S. Application Data

(63) Continuation of application No. 17/832,965, filed on Jun. 6, 2022, now Pat. No. 11,761,127, which is a
(Continued)

(51) Int. Cl.
*D04B 1/24*     (2006.01)
*A43B 1/04*     (2022.01)
(Continued)

(52) U.S. Cl.
CPC ............... *D04B 1/24* (2013.01); *A43B 1/04* (2013.01); *A43B 23/0235* (2013.01);
(Continued)

(58) Field of Classification Search
CPC . D04B 1/02; D04B 1/207; D04B 1/24; D04B 21/207; A43B 23/0205; A43B 1/04
See application file for complete search history.

(56) References Cited

U.S. PATENT DOCUMENTS

| 4,040,275 A | 8/1977 | Castello |
| 5,321,959 A | 6/1994 | Mitsumoto |

(Continued)

FOREIGN PATENT DOCUMENTS

| CN | 105411079 A | 3/2016 |
| EP | 0881314 A2 | 12/1998 |

(Continued)

*Primary Examiner* — Danny Worrell
(74) *Attorney, Agent, or Firm* — SHOOK, HARDY & BACON L.L.P.; Sarah Rieth

(57) ABSTRACT

In one aspect of the disclosure, a knitted component for use in an article of footwear may include a first knitted layer and a second knitted layer at least partially overlapping the first knitted layer. The knitted component may also include an interlooped area comprising the first knitted layer interlooped with the second knitted layer and a knitted loop structure that is adjacent the interlooped area and that comprises the first knitted layer freely separable from the second knitted layer to comprise a passageway. The first knitted layer has a first edge comprising a first opening of the passageway and a second edge comprising a second opening of the passageway. Each of the first edge and the second edge extend in a course-wise direction and the passageway extends between the first opening and the second opening in a wale-wise direction.

20 Claims, 23 Drawing Sheets

Related U.S. Application Data continuation of application No. 16/053,051, filed on Aug. 2, 2018, now Pat. No. 10,907,282.

(60) Provisional application No. 62/542,169, filed on Aug. 7, 2017.

(51) Int. Cl.
  *A43B 23/02* (2006.01)
  *D04B 1/10* (2006.01)
  *D04B 1/22* (2006.01)
  *D04B 21/20* (2006.01)

(52) U.S. Cl.
  CPC .......... *A43B 23/024* (2013.01); *A43B 23/025* (2013.01); *A43B 23/0295* (2013.01); *D04B 1/102* (2013.01); *D04B 1/22* (2013.01); *D04B 21/207* (2013.01); *D10B 2331/10* (2013.01); *D10B 2401/041* (2013.01); *D10B 2403/0113* (2013.01); *D10B 2501/043* (2013.01)

(56) References Cited

U.S. PATENT DOCUMENTS

| | | |
|---|---|---|
| 5,361,607 A | 11/1994 | Mitsumoto et al. |
| 6,065,311 A | 5/2000 | Essig et al. |
| 9,498,022 B2 | 11/2016 | Ikenaka et al. |
| 10,907,282 B2 | 2/2021 | Aceves Tinajero et al. |
| 11,761,127 B2 * | 9/2023 | Aceves Tinajero ...... D04B 1/24 36/87 |
| 2005/0229641 A1 | 10/2005 | Okamoto |
| 2008/0110048 A1 | 5/2008 | Dua et al. |
| 2009/0056384 A1 | 3/2009 | Sayer et al. |
| 2019/0037966 A1 | 2/2019 | Aceves Tinajero et al. |
| 2021/0108343 A1 | 4/2021 | Aceves Tinajero et al. |
| 2022/0298682 A1 | 9/2022 | Aceves Tinajero et al. |

FOREIGN PATENT DOCUMENTS

| | | |
|---|---|---|
| EP | 1396565 A1 | 3/2004 |
| EP | 3011854 A1 | 4/2016 |
| EP | 3412815 A1 | 12/2018 |

* cited by examiner

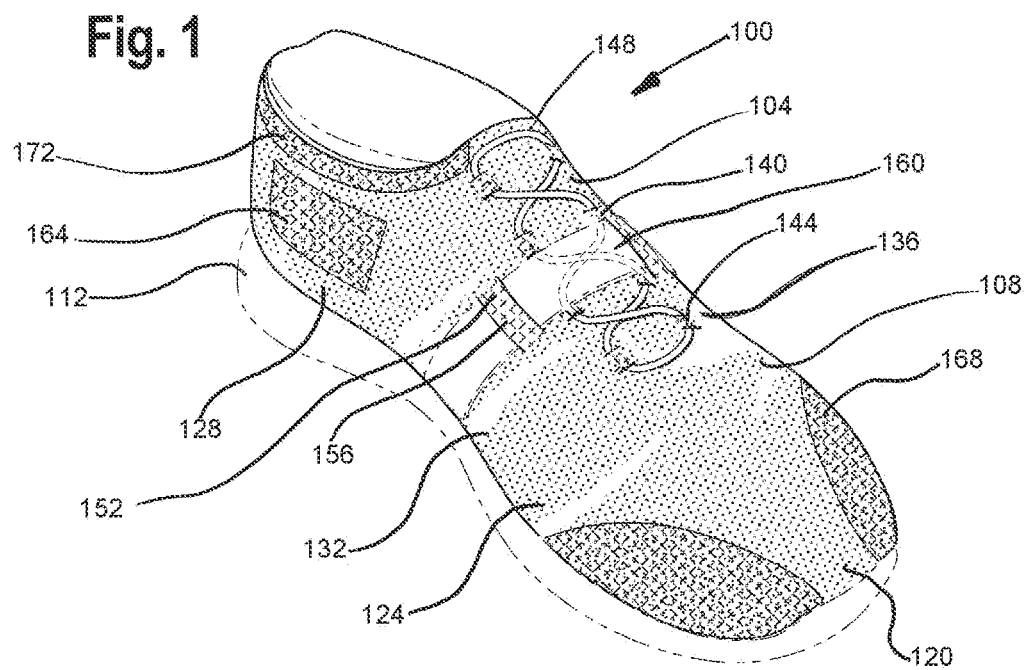
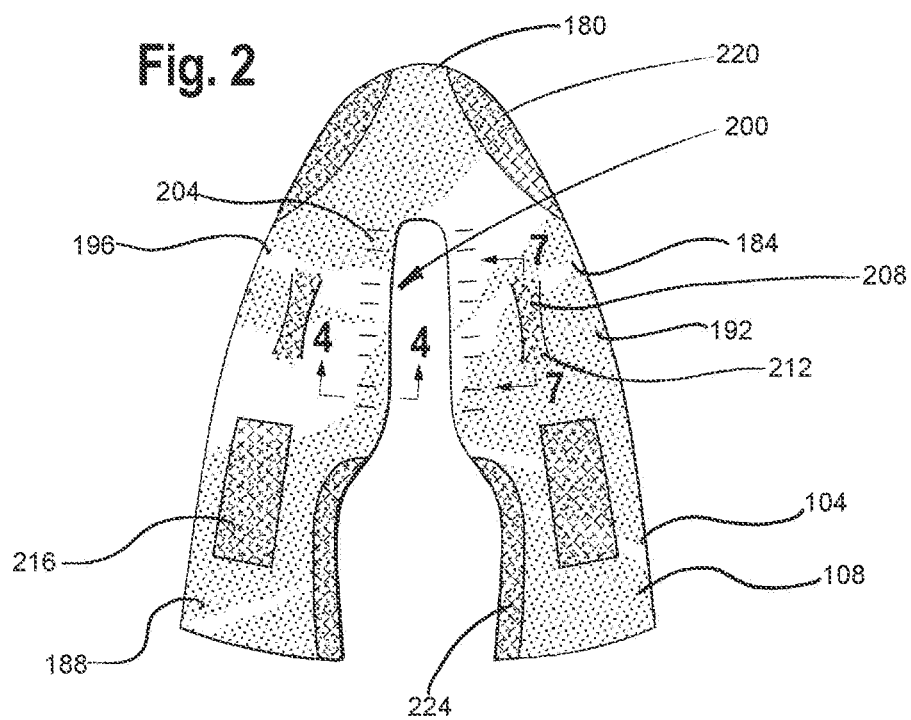

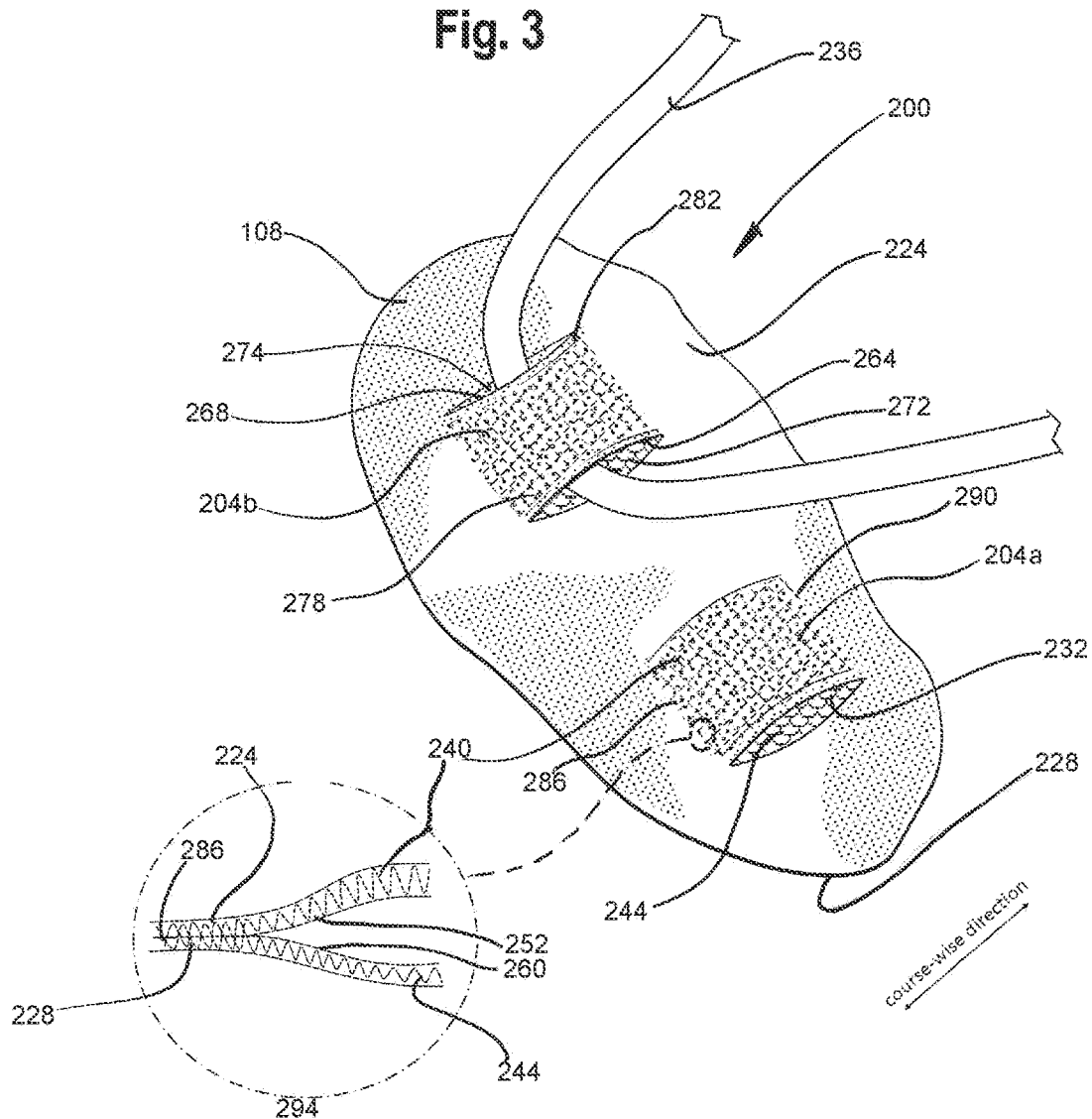

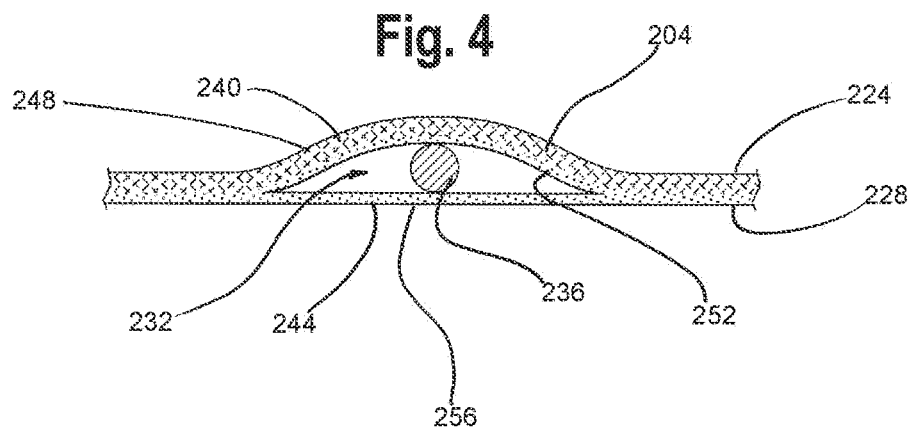
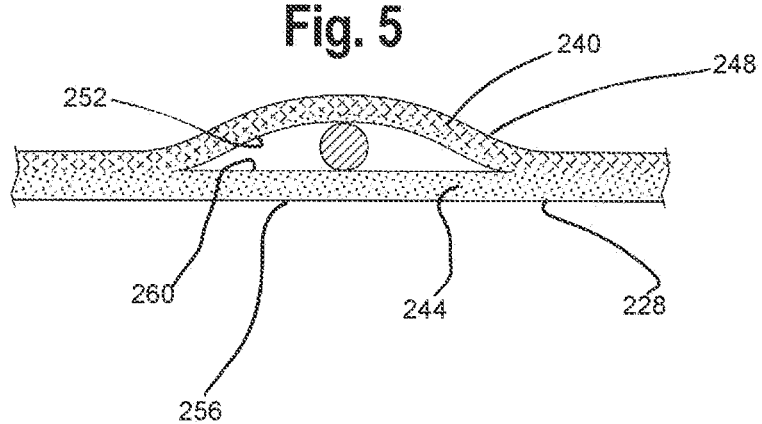

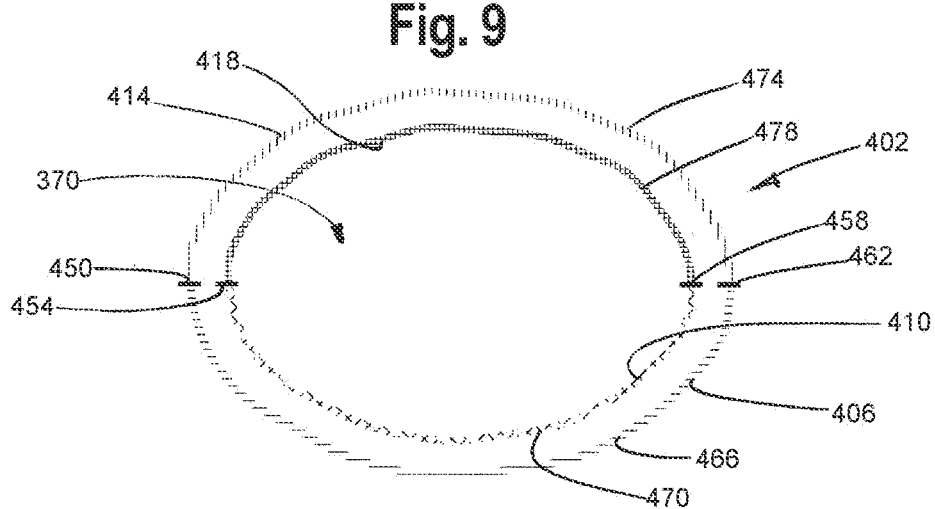
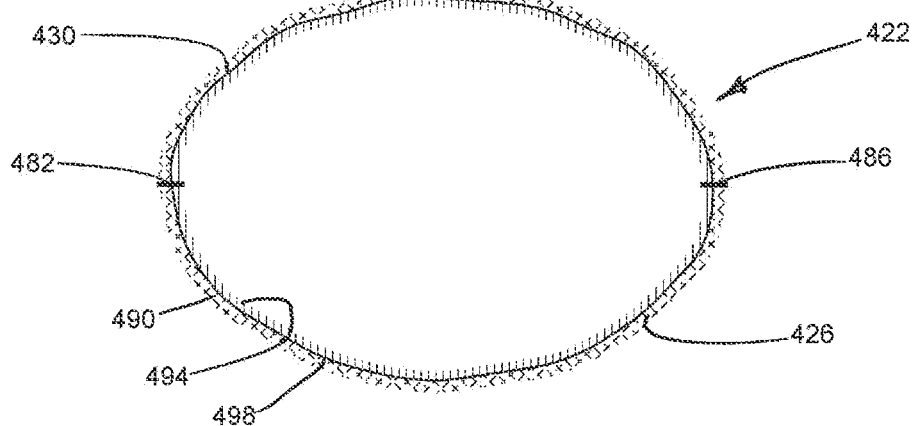
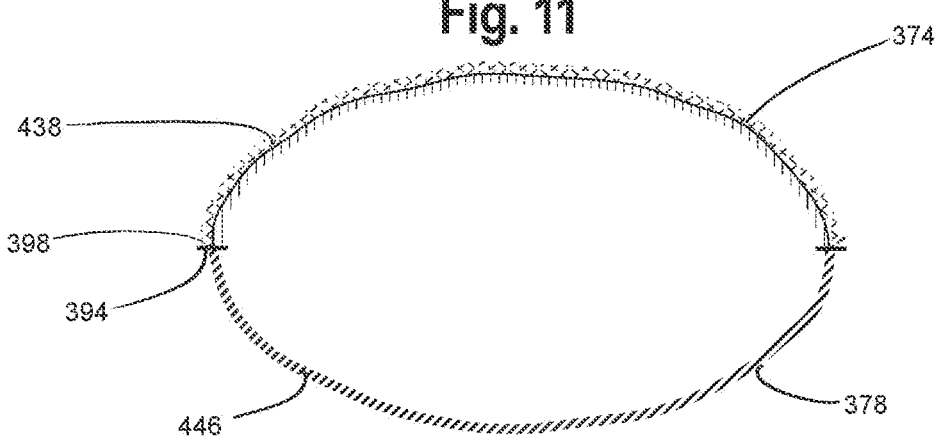

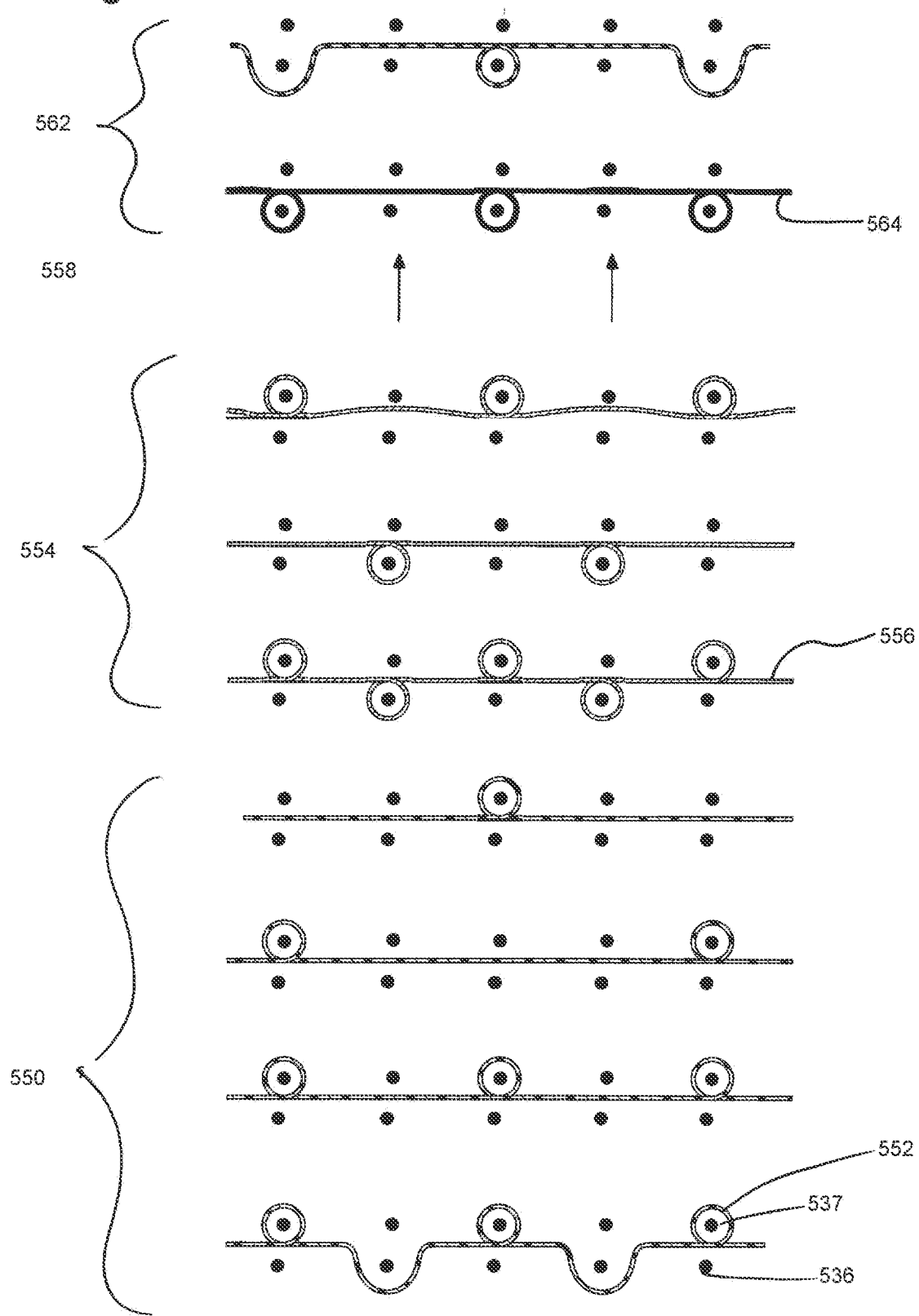

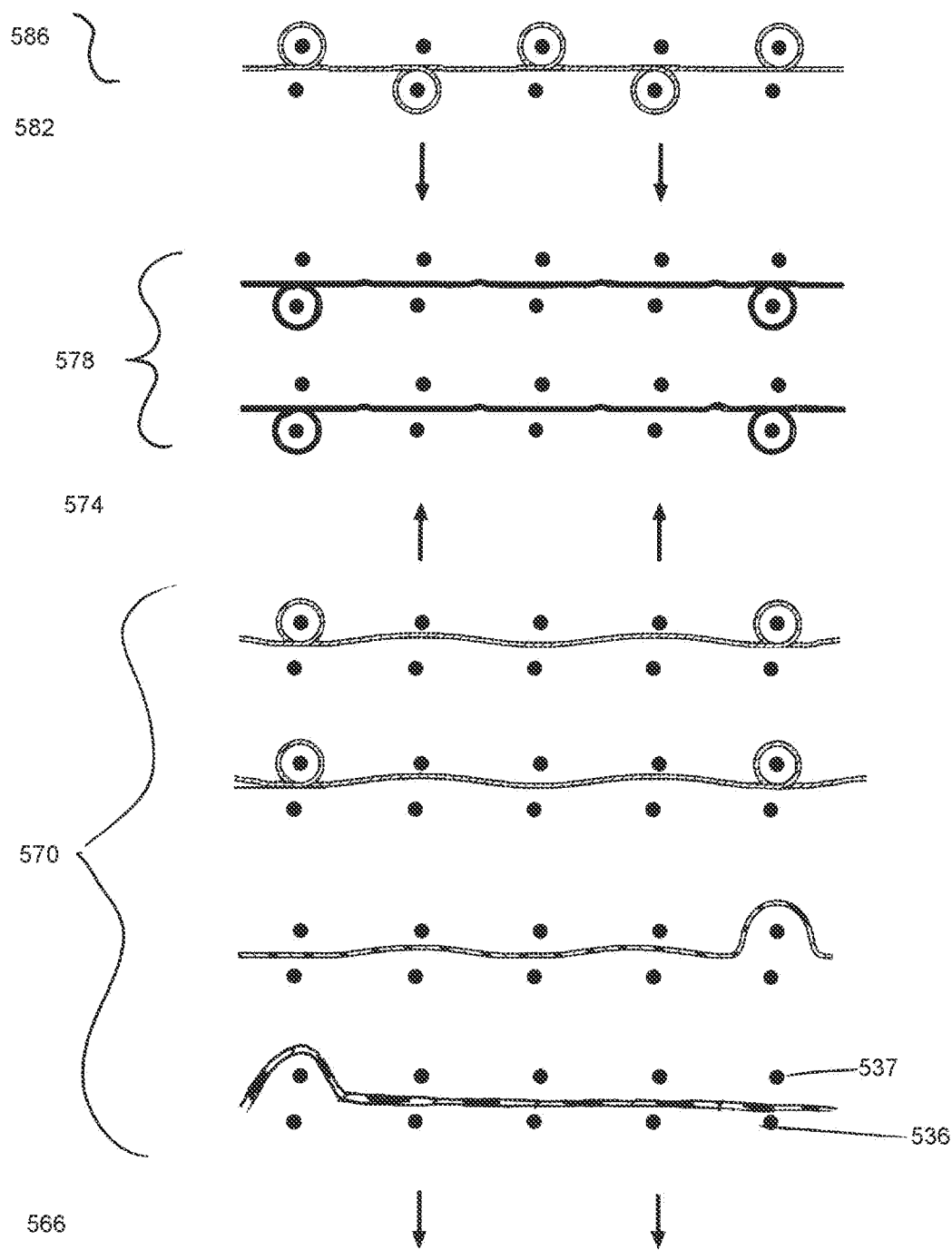

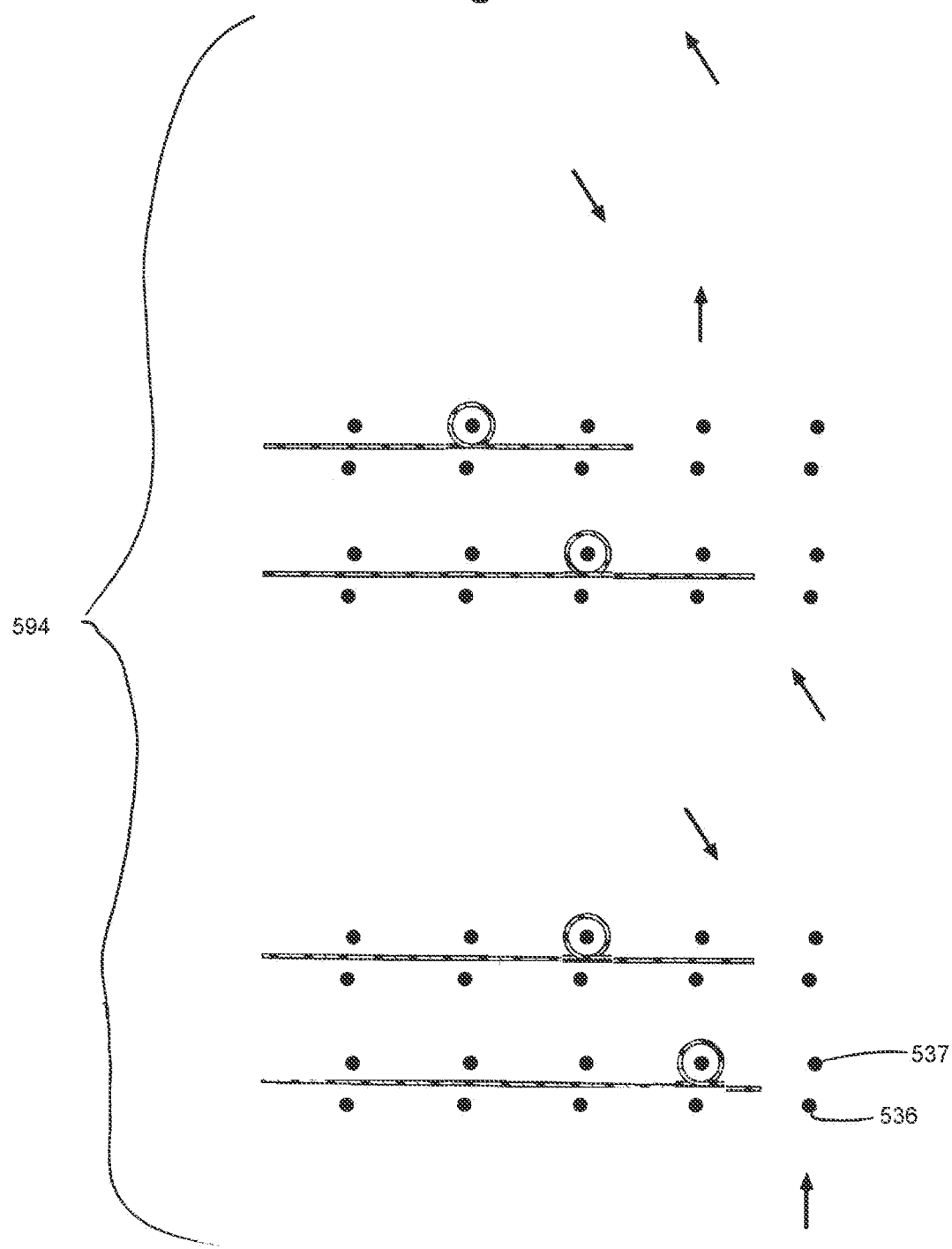

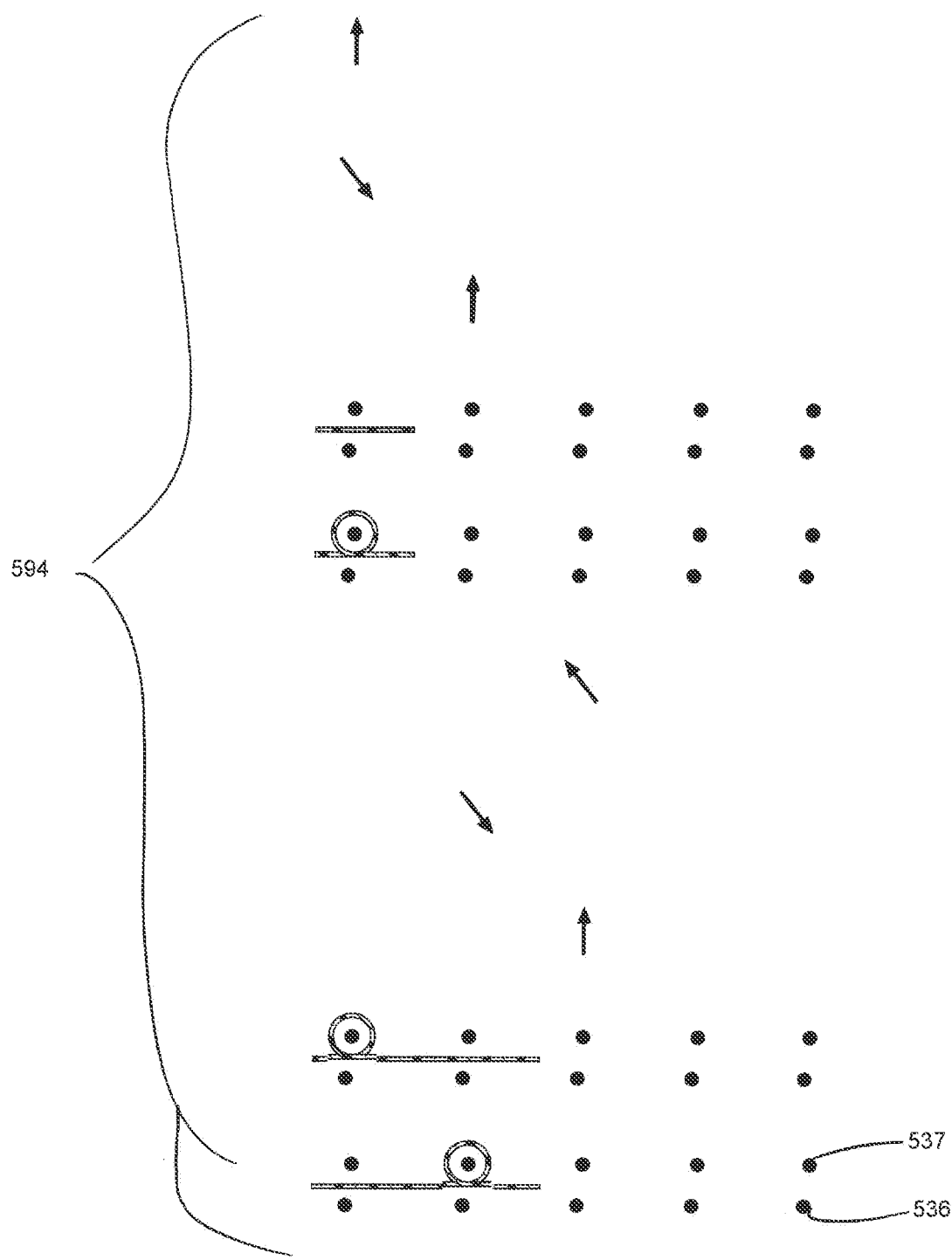

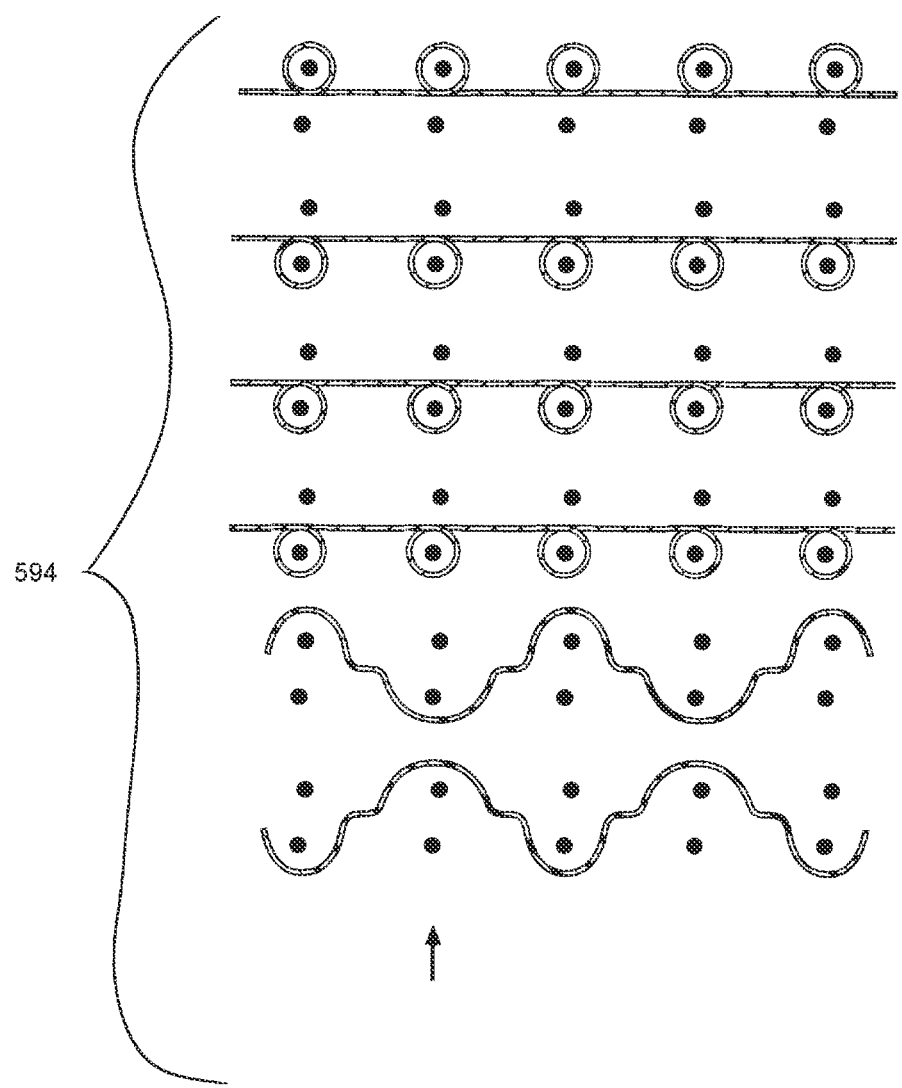

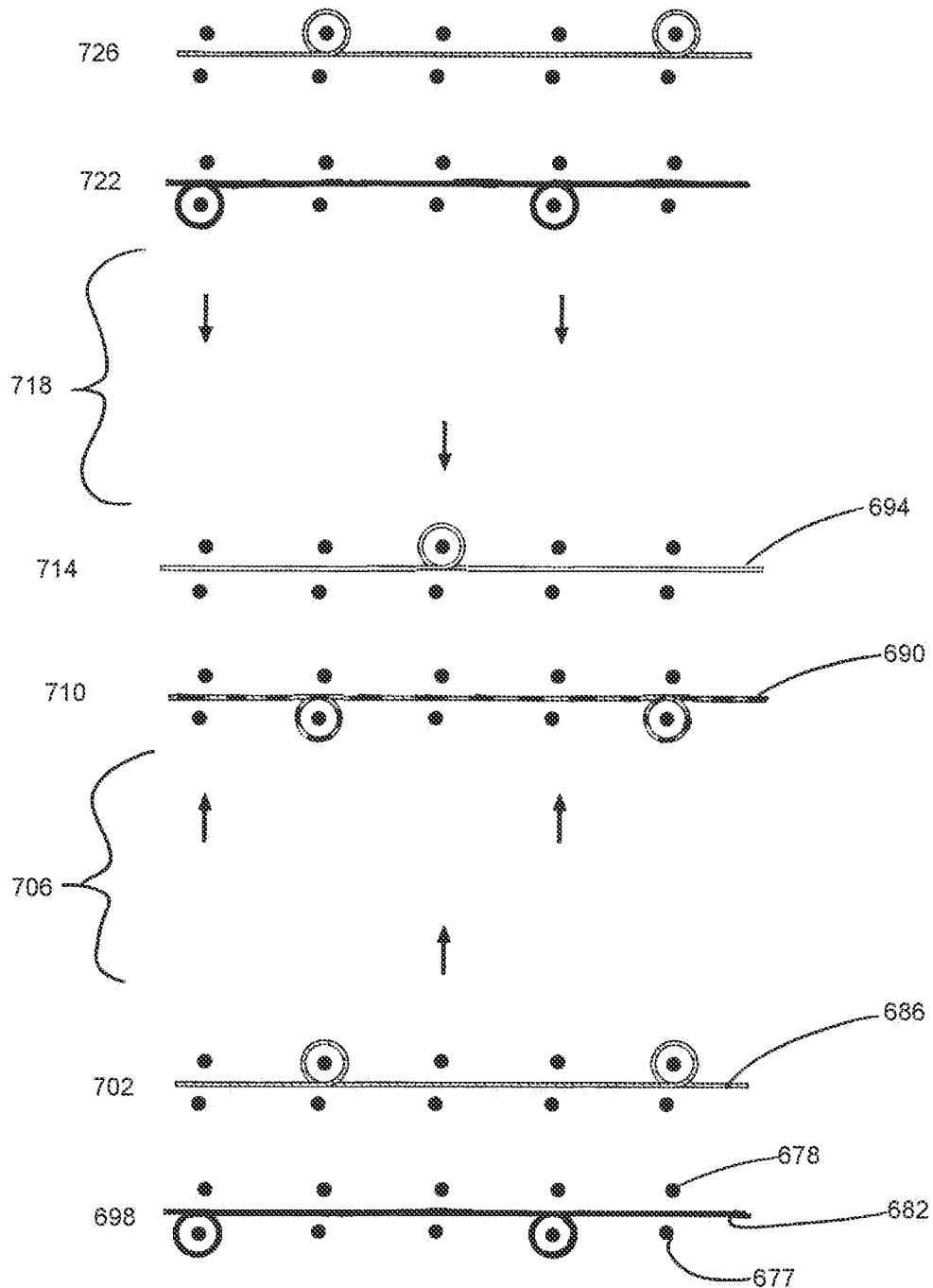

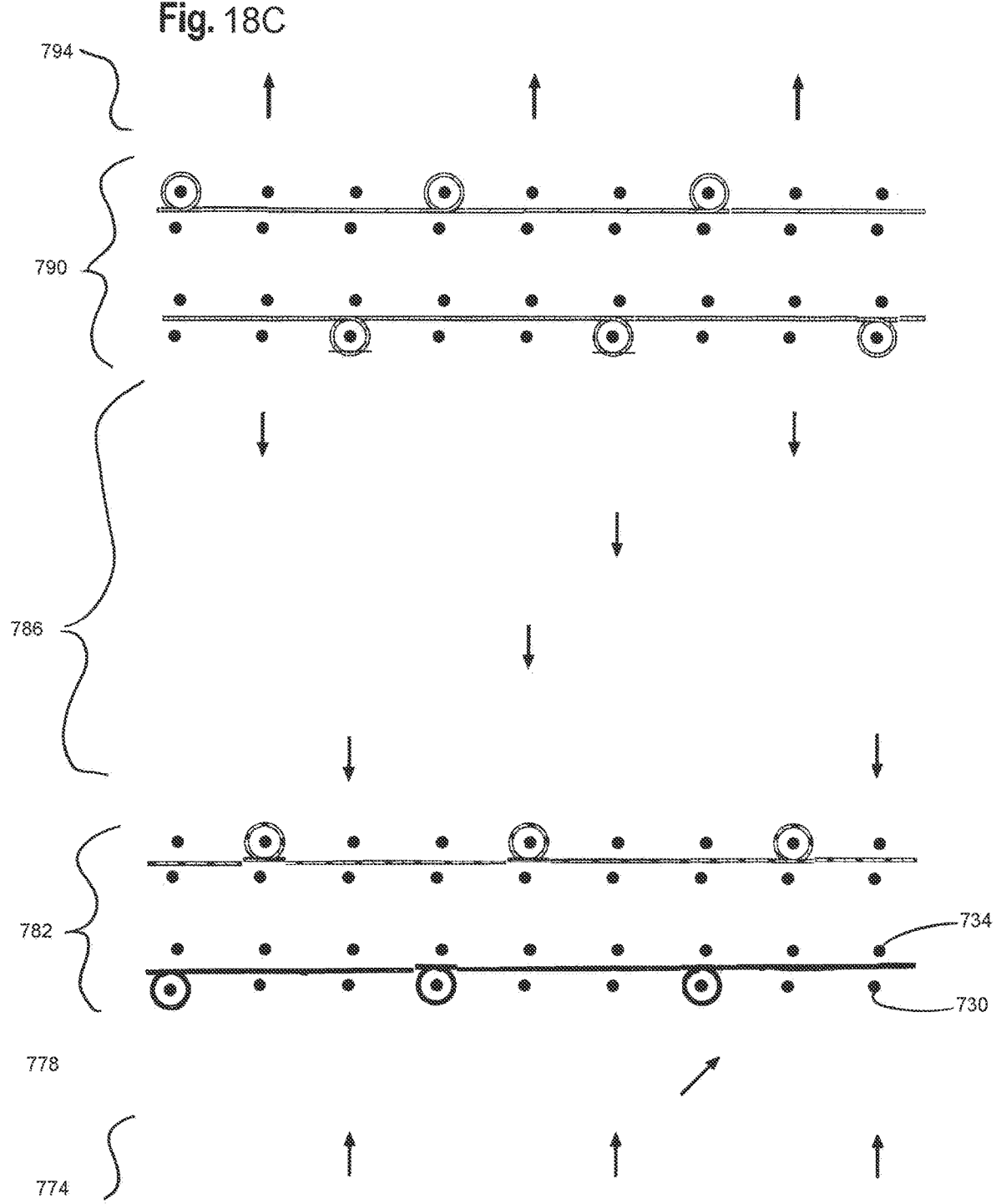

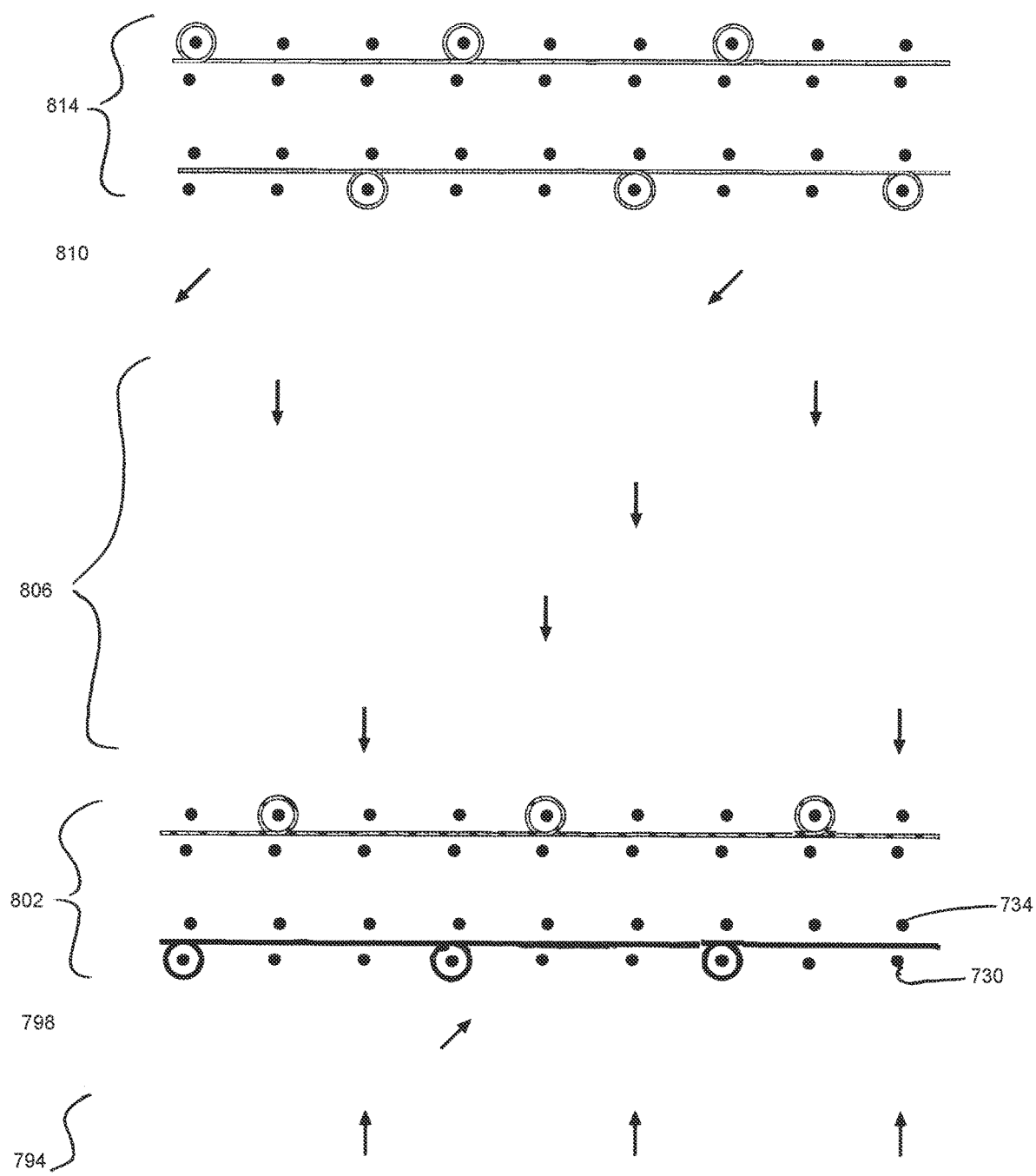

MULTIPLE LAYER KNITTED COMPONENTS HAVING MULTI-BED AREA

CROSS-REFERENCE TO RELATED APPLICATION

This application is a Continuation of U.S. patent application Ser. No. 17/832,965, (filed on Jun. 6, 2022), which claims the benefit of U.S. patent application Ser. No. 16/053,051, (filed on Aug. 2, 2018), which claims the benefit of U.S. Provisional Patent Application No. 62/542,169 (filed on Aug. 7, 2017). The entireties of the aforementioned applications are incorporated by reference herein.

BACKGROUND

The present embodiments relate generally to knitted components and methods of manufacturing knitted components, and more particularly, to knitted components for use in footwear applications having at least two overlapping knitted layers formed during a knitting process, with at least one layer having multi-bed knit construction.

Articles of footwear conventionally include an upper and optionally a sole structure. The upper may be secured to the sole structure and form a void on the interior of the footwear for comfortably and securely receiving a foot. The sole structure may be secured to a lower surface of the upper so as to be positioned between the upper and the ground.

Various materials are conventionally used in manufacturing the upper. The upper of athletic footwear, for example, may be formed from multiple material elements. The materials may be selected based upon various properties, including stretch-resistance, wear-resistance, flexibility, air-permeability, compressibility, and moisture-wicking, for example. Some uppers may be formed from a knitted material. Incorporating knitted components into an upper, or knitting an upper, may provide advantages over conventionally manufactured uppers, for example based on properties of the knit due to structure, configuration, or materials.

In knitted components, such as those for use in articles of footwear, it may be advantageous to include knitted zones including freely-separable overlapping areas. Such knitted components may have numerous applications, including forming part of fastening systems, storing components, permitting passage of objects (e.g., tensile strands), surrounding a wearer's foot, and reducing friction experienced by a wearer. In such applications, it may be advantageous to improve the strength and durability of the knit component, for example by imparting a multi-bed knit construction to at least one of the overlapping areas. It may be further advantageous to form such a knitted component from a single knitting process, in order to reduce time and materials associated with costly post-knitting steps.

SUMMARY

In one aspect of the disclosure, a knitted component for use in an article of footwear may include a first layer with a multi-bed first area having a first surface and an opposite facing second surface. The knitted component may include a second layer with a second area overlapping the first area. The second area may have a first surface and an opposite facing second surface. The knitted component may include a plurality of interlayer knit stitches interlooping at least one yarn of the first layer with at least one yarn of the second layer at an interface between the second surfaces of the first and second areas. The interior surfaces of the first area and the second area may define at least part of a freely separable area between the first and second areas. In another aspect, the first area may have a first edge forming part of a first opening in the first layer and may have a second edge forming part of a second opening in the first layer. The first and second openings and the freely separable area may form a passageway. In another aspect, at least one of the first and second edges may have a course-wise orientation. In another aspect, the first and second areas may form a knitted loop structure. In another aspect, the knitted loop structure may include a binding area coextensive with the first or second edge. In another aspect, the knitted loop structure may form part of a fastening system of an article of footwear. In another aspect, the first and second areas may have multi-bed construction. In another aspect, an overfoot portion including one of the first and second areas may join with an underfoot portion including one other of the first and second areas around a perimeter. In another aspect, a first collar portion including one of the first and second areas may join with a second collar portion including one other of the first and second areas.

In another aspect of the disclosure, a method of knitting a knitted component may include knitting a portion of a multi-bed first area of a first layer on a plurality of first area needles on a first needle bed and a second needle bed. The method may include transferring at least part of the first area from the first needle bed to the second needle bed. The method may include knitting a second area of a second layer on a plurality of second area needles on the first needle bed. The method may also include forming a plurality of interlayer knit stitches between the first and second layers where the first area and second area are coextensive. The first area needles may differ from the second area needles. In another aspect, knitting a portion of a multi-bed first area may also include knitting an edge defining part of an opening in the first layer. In another aspect, knitting a portion of a multi-bed first area may also include knitting a binding area coextensive with the edge. In another aspect, the first area and the second area may form at least part of a knitted loop structure. In another aspect, an overfoot portion including one of the first and second areas may join with an underfoot portion including one other of the first and second areas around a perimeter. In another aspect, a first collar portion that may include one of the first and second areas may join with a second collar portion that may include one other of the first and second areas. In another aspect, the second area may have multi-bed construction.

In another aspect of the disclosure, a method of knitting a knitted component may include knitting a multi-bed first area of a first layer, knitting a freely-separable second area of a second layer in an overlapping relationship with the first area while knitting the first area, and interlooping at least one yarn of the first layer with at least one yarn of the second layer at an interface between an interior surface of the first area and an interior surface of the second area. In another aspect, the first area and second area may form at least part of a knitted loop structure. In another aspect, the first area and second area may form at least part of an overfoot portion that may be joined with an underfoot portion around a perimeter of the underfoot portion. In another aspect, knitting a multi-bed first area of a first layer may include knitting the first area with single-bed construction and imparting multi-bed construction to the first area by executing an inter-bed transfer of at least one stitch of the first area.

Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 depicts an article of footwear incorporating a knitted component.

FIG. 2 depicts a knitted component having a first layer with exterior areas overlapping interior areas of a second layer.

FIG. 3 depicts a knitted loop structure of the knitted component of FIG. 1.

FIG. 4 depicts a section view of the knitted loop structure of FIGS. 2, 3.

FIG. 5 depicts a section view of another knitted loop structure.

FIG. 9 depicts a section view of one knitted zone of the knitted component of FIG. 8.

FIG. 10 depicts a section view of another knitted zone of the knitted component of FIG. 8.

FIG. 11 depicts a section view of yet another knitted zone of the knitted component of FIG. 8.

FIGS. 13A-13G depict a knitting diagram corresponding with at least one of the methods of FIG. 12.

FIG. 17 depicts a knitting diagram corresponding with at least one zone of the knitted component of FIG. 8.

FIGS. 18A-D depict a knitting diagram corresponding with another zone of the knitted component of FIG. 8.

DETAILED DESCRIPTION OF THE PREFERRED EMBODIMENTS

Figure 6:
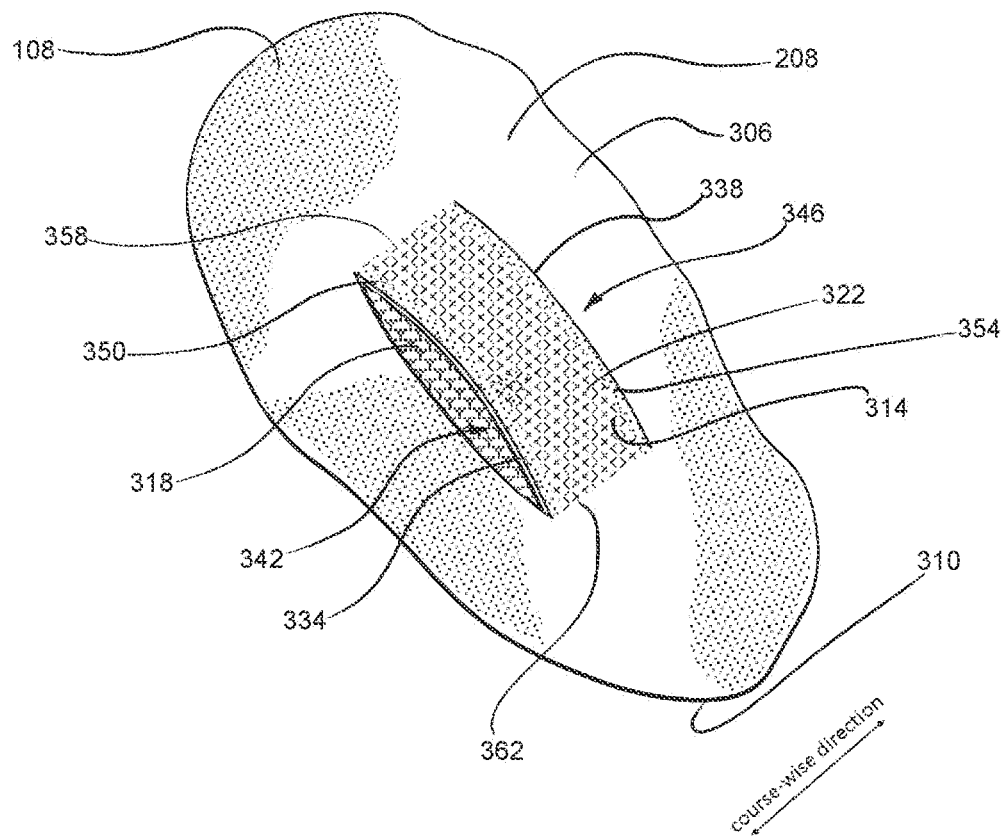
FIG. 6 depicts another knitted loop structure of the knitted component of FIG. 1.

FIG. 1 illustrates an article of footwear 100 formed with an upper 104 substantially formed as a knitted component 108. As shown, upper 104 may be secured to at least one sole structure 112. Article 100 has a general configuration suitable for walking or running. Concepts associated with footwear, including the upper 104 and knitted component 108, may also be applied to a variety of other athletic footwear types, including but not limited to baseball shoes, basketball shoes, cross-training shoes, cycling shoes, football shoes, soccer shoes, sprinting shoes, tennis shoes, and hiking boots. The concepts may also be applied to footwear types that are generally considered to be nonathletic, including dress shoes, loafers, sandals, and work boots. The concepts disclosed herein apply, therefore, to a wide variety of footwear types. Furthermore, the concepts disclosed herein may apply to articles beyond footwear, such as accessories or apparel.

In the embodiment of FIG. 1, the upper 104 may generally provide a comfortable and secure covering for a wearer's foot. As such, the upper 104 may define a void to effectively receive and secure a foot within article 100. Moreover, sole structure 112 may be secured to a lower area of upper 104 and may extend between the foot and the ground to attenuate ground reaction forces (i.e., cushion the foot), provide traction, enhance stability, and influence the motions of the foot.

For reference purposes, article 100 may be divided generally along a longitudinal direction (heel-to-toe) into three general regions: a forefoot region 120, a midfoot region 124, and a rearfoot region 128. Forefoot region 120 may generally include portions of article 100 corresponding with the toes and the joints connecting the metatarsals with the phalanges. Midfoot region 124 may generally include portions of article 100 corresponding with an arch area of the foot. Rearfoot region 128 may generally correspond with rear portions of the foot, including areas that cover the calcaneus bone (which comprises a portion of a wearer's heel). Additionally, rearfoot region 128 may cover some or all of the wearer's malleoli and talus (which comprise a portion of the ankle). Article 100 also includes a medial side 132 and a lateral side 136, which may extend through each of forefoot region 120, midfoot region 124, and rearfoot region 128, and may correspond with opposite sides of article 100. More particularly, lateral side 136 may correspond with an outside area of the foot (i.e., the surface that faces away from the other foot), and medial side 132 may correspond with an inside area of the foot (i.e., the surface that faces toward the other foot). Forefoot region 120, midfoot region 124, and rearfoot region 128, medial side 132, and lateral side 136 are not intended to demarcate precise areas of article 100, but rather are intended to represent general areas of article 100 to aid in the following discussion.

As shown in FIG. 1, article 100 may have one or more zones that include separable and overlapping areas formed as a result of a knitting process. At least one of the separable areas of each zone may have a knitted construction characteristic of formation on least two needle beds of a knitting machine, i.e., multi-bed construction. For example, a first zone 140 may exist in a throat region of article 100 and may include at least one knitted loop structure 144 formed as separable areas and having openings to allow an object to pass therethrough, e.g., a lace 148, tensile strand, strap, or other object. Loop structure 144 may form part of a fastening system for securing a wearer's foot within article 100. As another example, second zone 152 may exist in the medial side 132 of article 100, may include at least one knitted loop structure 156 formed as separable areas, may have openings, and may be oriented differently from the knitted loop structure 144 in first zone 140. Knitted loop 156 may accommodate a strap 160 or other object, for example as part of a fastening system. As another example, third zone 164 may exist in the rearfoot region 128 of article 100 (e.g., on the medial or lateral sides 132, 136), and may not have any openings, but may nevertheless have freely separable knitted areas, for example, to facilitate movement of an outer layer relative to an inner layer in order to reduce friction experienced by a wearer. Another zone (not shown), may have a single opening between two areas, for example, forming a pocket that may retain a component. As another example, fourth zone 168 may exist on the medial side 132 and/or lateral side 136 of forefoot region 128. As yet another example, fifth zone 172 may exist in a collar region of article 100 and may include two or more freely separable and overlapping areas, such as to reduce friction or to form a channel that may accommodate an object (such as a tensile strand). To clarify, the aforementioned zones are merely exemplary. Similar structures may exist in other locations on the article 100, may have different orientations, different dimensions, etc. Also, any zone may have any of the characteristics described in this application with respect to other zones.

With reference to FIG. 2, at least a portion of the upper 104, and potentially substantially the entirety of the upper 104, may be formed of the knitted component 108. The knitted component 108 may be formed as an integral one-piece element during a knitting process, such as a weft knitting process (e.g., with a flat knitting machine with one, two, or more needle beds, or with a circular knitting machine), a warp knitting process, or any other suitable knitting process. That is, a knitting process on a knitting machine may substantially form the knit structure of the knitted component 108 without the need for significant post-knitting processes or steps. Alternatively, two or more portions of knitted component 108 may be formed separately as distinct integral one-piece elements, and then the respective elements may be attached.

Forming the upper 104 with knitted component 108 may provide advantages including, but not limited to, a particular degree of elasticity (for example, as expressed in terms of Young's modulus), breathability, bendability, strength, moisture absorption, weight, abrasion resistance, and/or a combination thereof. These characteristics may be accomplished by selecting a particular knit structure (e.g., a ribbed knit structure, a single jersey knit structure, or a double jersey knit structure), by varying the size and tension of the knit structure, by using one or more yarns formed of a particular material (e.g., a polyester material, a relatively inelastic material, or a relatively elastic material such as elasticated yarns), by selecting yarns of a particular size (e.g., denier), and/or a combination thereof. Except as qualified herein, any of the zones, layers, and areas of knitted component 108 may include one or more materials. Knitted component 108 may also provide desirable aesthetic characteristics by incorporating yarns having different colors, textures or other visual properties arranged in a particular pattern. The yarns themselves and/or the knit structure formed by one or more of the yarns of the knitted component may be varied at different locations such that knitted component 108 may have two or more portions with different properties (e.g., a portion forming the throat area of the upper may be relatively elastic while another portion may be relatively inelastic). In some embodiments, knitted component 108 may incorporate one or more materials with properties that change in response to a stimulus (e.g., temperature, moisture, electrical current, magnetic field, or light), including materials that may be non-fusible or fusible. For example, knitted component 108 may include yarns including at least one fusible thermoplastic polymer material or material composition (e.g., at least one polyurethane, polyamide, polyolefin, and/or nylon) that transitions from a solid state to a softened or liquid state when subjected to certain temperatures at or above its melting point and then transitions back to the solid state when cooled. When a fusible yarn is heated and fused to non-fusible yarns, this process may have the effect of stiffening or rigidifying the structure of knitted component 108 by forming a fused area. Moreover, joining portions of non-fusible yarn using fusible yarns may have the effect of securing or locking the relative positions of non-fusible yarns within knitted component 108, thereby imparting stretch-resistance and stiffness. That is, portions of non-fusible yarn may not slide relative to each other when fused with the fusible yarn, thereby preventing warping or permanent stretching of knitted component 108 due to relative movement of the knit structure. Another feature of using fusible yarns in portions of knitted component 108 relates to limiting unraveling if a portion of knitted component 108 becomes damaged or one of the non-fusible yarns is severed. Accordingly, if areas of knitted component 108 include fusible yarns at all, those areas may be configured with both fusible and non-fusible yarns.

Figure 8A:
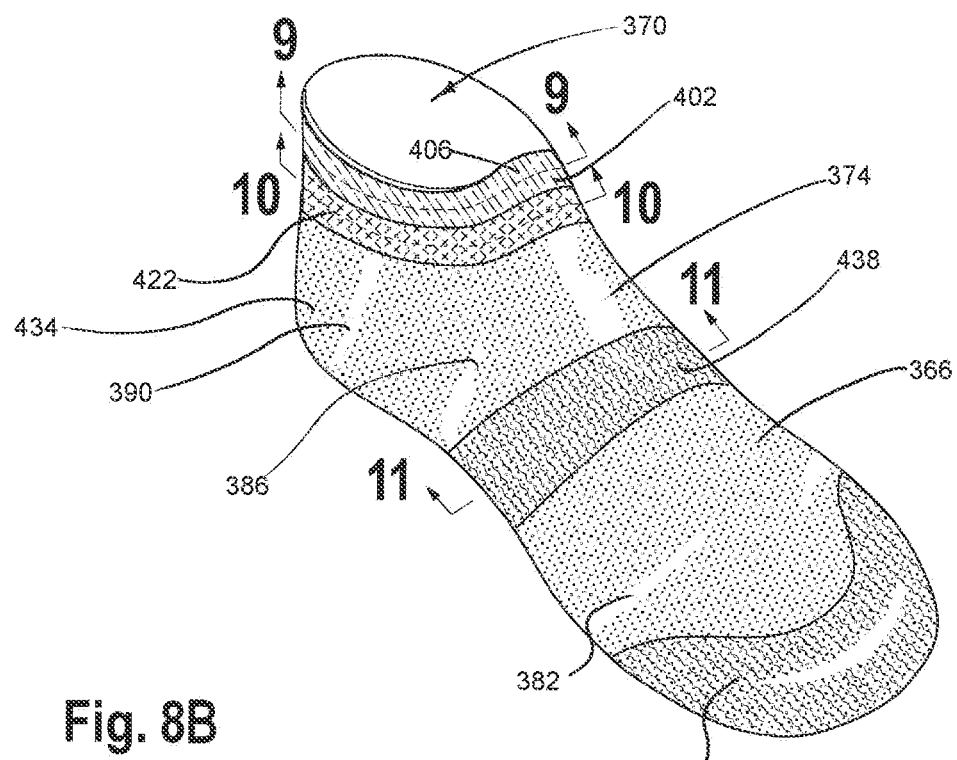
FIG. 8A depicts another knitted component having exterior areas overlapping interior areas.
Figure 8B:
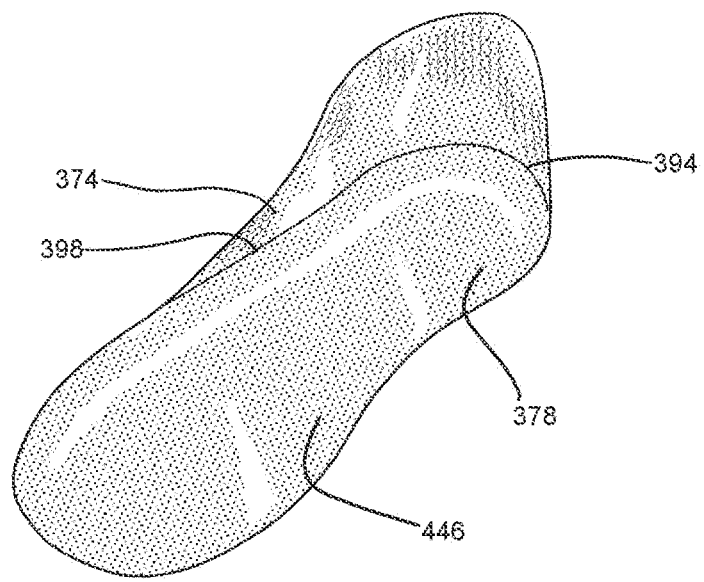
FIG. 8B depicts another view of the knitted component of FIG. 8A.

Knitted component 108 may be knitted in a two-dimensional configuration and subsequently formed into the shape of a wearer's foot through post-knitting methods. For example, the knitted component 108 of FIG. 2 reflects a two-dimensional "U" shape or a "horseshoe" shape. However, it shall be understood that the "horseshoe"-shaped or "U-shaped" shapes of FIG. 2 is merely exemplary, and that knitted components embodying the disclosure of this application may be knitted with edges in different locations than FIG. 2, for example a "C-shaped" knitted component or a two piece knitted component (such as with the rearfoot region knitted as a distinct knitted component from the forefoot and mid-foot region). Alternatively, referring briefly to FIGS. 8A-B, a knitted component 366 may be knitted in a three-dimensional configuration by which the knitting process knits knitted component 366 substantially into the shape of a wearer's foot, i.e., substantially surrounding a foot-shaped void. Such a three-dimensional knitted component 366 may include an overfoot portion 374 joined with an underfoot portion 378 along a perimeter 394 as a result of the knitting process, for example with interlayer knit stitches where stitches of a first layer interloop with stitches of a second layer. Such a three-dimensional knitted component 366 may resemble a bootie or a sock following the knitting process. As used herein, the term "knitted component" is not intended to limit said knitted component to a particular shape having a particular edge configuration, or to a knitted component knitted in either two- or three-dimensions.

Turning back to FIG. 2, the knitted component 108 may be divided into a forefoot region 180, a midfoot region 184, and a rearfoot region 188, which may correspond with the forefoot region 120, midfoot region 124, and rearfoot region 128 of article 100, respectively. Likewise, the knitted component 108 may have a medial side 192 and a lateral side 196, corresponding to the medial and lateral sides 132, 136 of article 100.

As shown in FIG. 2, the knitted component 108 may include one or more knitted zones having particular knit structures, in particular overlapping and freely separable knitted areas, which may (but need not) have positions and orientations corresponding with zones of the article 100 of FIG. 1. For example, a first zone 200 may exist in a throat region of knitted component 108 and may include at least one knitted loop structure 204 having openings to allow an object, e.g., a lace, tensile strand, strap, or other object, to pass therethrough. As another example, a second zone 208 may exist in the medial side 192 of knitted component 108, may include at least one knitted loop structure 212, and may be oriented differently from the knitted loop structure 204 in first zone 200. As another example, a third zone 216 may exist in the rearfoot region 188 of the knitted component 108, and may form a pocket (with one opening) or may not have any openings. As another example, fourth zone 220 may exist in the forefoot region 180. As yet another example, fifth zone 224 may exist in a collar region of knitted component 108, and may include freely separable areas.

Generally speaking, any of the aforementioned zones of the knitted component 108 may have a first knit layer that may form a first surface, and a second knit layer that may form a second surface. The first and second layers may each include one or more materials selected to impart advantageous properties to the knitted component. For example, the first layer may eventually correspond to an exterior surface of the article of footwear 100, and therefore may include courses of a relatively inelastic first yarn offering abrasion resistance and durability. On the other hand, the second layer may eventually correspond with an interior surface of the article of footwear 100, and therefore may include one or more courses of yarn having relatively soft hand, for example a yarn having a napped finish for softness.

Generally speaking (with specific references to be discussed later), within each zone, the first layer may include a first knitted area, and the second layer may include a second knitted area. The first area may overlap and be freely separable from the second area. In other words, the first area and second area may have opposite facing surfaces, thereby making the first area freely separable from the second area. That is, the first area may have a first surface generally facing a first direction, and a second surface generally facing the opposite direction. Likewise for the second area. Although the first area of the first layer may be freely separable from the second area of the second layer, it shall be understood that other areas of the first layer need not be freely separable from the second layer, for example where interlayer knit stitches interloop courses of the first layer with the second layer.

The first area may also be coextensive with the second area. For example, one aspect of the first and second areas may end at one or more interlayer knit stitches (e.g., a line of interlayer knit stitches forming an interlayer knit stitch line, described in detail later). In such a case, the first and second areas would be joined where coextensive. As another example, the first and second areas may end at an edge that defines at least part of an opening in the first layer. Such an edge may exist only in the first area, but may nevertheless indicate where one dimension of the overlapping second area ends. In this case, the first and second areas would remain freely separable where coextensive.

At least one of the freely separable and overlapping first and second areas may have a knitted construction characteristic of formation on least two needle beds of a knitting machine, i.e., "multi-bed" knit construction. Such multi-bed knit construction may be characterized by two opposing faces of knitted loops and/or tucks, e.g., one face of loops formed on a first needle bed, and a second face of loops formed on a second needle bed. A knitted component having "multi-bed" construction has "multi-bed" knit structures. Common multi-bed knit structures include double jersey, rib, interlock, cardigan, other "double bed" knit structures initially formed on at least two needle beds, and other knit structures having two opposing faces of knitted loops or tucks, including full-gauge and less-than full gauge variations of those structures. As used in this application, "multi-bed" knit structures may also include knit structures initially formed on a single needle bed, but which may ultimately have at least two faces of knit loops or tucks as a result of additional steps executed during the knitting process, e.g., inter-bed transfers. As one example, a multi-bed layer, area, or course of yarn may include a plurality of loops initially knitted on a first needle bed (e.g., in single jersey), but at a subsequent step during the knitting process, at least one loop may be transferred to a second needle bed (for example, via an inter-bed transfer, including an inter-bed lateral transfer), subsequent to which time the zone, layer, area, or course may have two opposing loops or faces of loops. One example of an inter-bed transfer would be the transfer of a knit loop from a needle on a first needle bed to an opposite needle on a second needle bed (e.g., from a third needle on a front needle bed to a third needle on a rear needle bed). Inter-bed transfers include inter-bed lateral transfers, where a knit loop is transferred from a needle on a first needle bed to a non-opposite needle on a second needle bed (e.g., from the third needle on the front needle bed to a second needle on the rear needle bed).

In some embodiments, the first area may have a different stitch density than the second portion. For example, the first area may have a half gauge stitch density and the second area may have a less-than half gauge stitch density. As used in this application, the terms "full gauge," "half gauge," and "less than full gauge," generally refer to the stitch density of a knit component, not to specific knitting techniques. Generally, a knit component and a knit layer may include an area having a "full gauge" stitch density if that area contains stitches (e.g., loops or tucks) formed on at least two consecutive needles of a needle bed (often more than two consecutive needles). Similarly, the same knit component may include an area having a "half gauge" stitch density, in which that area contains stitches formed on every other needle. Similarly, the same knit component may have "less than full gauge" areas that are neither full gauge nor half gauge, for example one-third gauge (stitches formed on every third needle) or one-quarter gauge (stitches formed on every fourth needle).

In some embodiments, the first area may have multi-bed knitted construction, and the second area may have knitted construction characteristic of formation on a single needle bed ("single-bed" knit construction, e.g., single jersey). Alternatively, both the first and second areas may have multi-bed construction. In other embodiments, the first area may have single-bed construction and the second area may have multi-bed construction. To clarify, either or both of the first or second areas may have multi-bed construction.

Referring now to FIG. 3, the first zone 200 of the integral one-piece knitted component 108 of FIG. 1 may have a first layer 224 (which may eventually correspond to an exterior of the article of footwear 100) and a second layer 228 (which may eventually correspond to an interior of the article of footwear 100) that together form a passageway 232 that may have a wale-wise orientation. The first and second layers 224, 228 may include one or more knitted loop structures 204 a, b (and possibly greater or fewer loop structures than shown in FIG. 3.) The knitted loop structures 204 a, b may eventually form part of a fastening system in the article 100, such as a lacing system or a strap system. For visualization purposes, FIG. 3 illustrates a lace 236 passing through loop structure 204b. The knitted loop structures 204 a, b may be integral to the knitted component 108, i.e., formed during the same knitting process that forms the remainder of knitted component 108, and not attached as a result of post-knitting steps. The knitted component 108 may embody multi-bed knit construction.

Referring to FIGS. 3, 4, and 5 together, each knitted loop structure 204 may include an exterior area 240 and an interior area 244, with exterior area 240 overlapping and being freely separable from the interior area 244 as a result of the knitting process. At least one of exterior area 240 and interior area 244 may have multi-bed knit construction. For example, in FIG. 4, exterior area 240 may have multi-bed knit construction. In FIG. 5, by comparison, both exterior area 240 and interior area 244 may have multi-bed construction. Exterior area 240 may have a first surface 248 and an opposite facing second surface 252 oriented toward the passageway 232. Similarly, interior area 244 may have a first surface 256 and an opposite facing second surface 260. Exterior area 240 may include first and second edges 264, 268, which may form at least part of first and second openings 272, 274 in the first layer 224, respectively. As a result of the opposite-facing surfaces of the exterior and interior areas 240, 244, the exterior area 240 may remain freely separable from the interior area 244, including along first and second edges 264, 268. Thus, the exterior and interior areas 240, 244 may form the passageway 232. To clarify, the first surfaces 248, 256 of the exterior and interior areas 240, 244, respectively may be oriented away from passageway 232 and the opposite facing second surfaces 252, 260 may be oriented toward the passageway 232. In the embodiment of FIG. 3, the exterior area 240 may have an appearance that is approximately geometric (e.g., rectangular or hyperbolic) or organic, and the passageway 232 may have an approximately forefoot-to-rearfoot orientation, which may correspond with a wale-wise orientation.

In FIG. 3, the first and second edges 264, 268 of exterior area 240 may have a generally course-wise orientation. The first and second edges 264, 268 may also correspond to first and second binding areas 278, 282, respectively, which are designed to resist rolling, unravelling, and loss of resilience or integrity (for example, due to repeated stretching, as with a lace, strap, tensile strand, or other object). The binding areas 278, 282 may be formed from one or more courses of yarns having relatively high tenacity and tensile strength, for example polyester multifilament yarns. Additionally or alternatively, binding areas 278, 282 may be formed from one or more courses of yarns or strands having a thermoplastic material, which may form a reinforced fused area when subjected to a post-knitting heat treatment process. The binding areas 278, 282 may be formed by executing a sequence of binding steps during a knitting process, in which courses of yarn forming the exterior area 240 may gradually tie into the first layer 224. The binding areas 278, 282 may include a plurality of gradually shorter courses of yarn. To clarify, in all embodiments having edges, binding areas may impart advantageous properties to the edge, but nevertheless are optional.

With continued reference to FIGS. 3-5, the exterior and interior areas 240, 244 may be coextensive in one or more directions. As one example, the exterior and interior areas 240, 244 may be coextensive at the first and second edges 264, 268 formed at wale-wise boundaries of the exterior area 240. Although the first and second edges 264, 268 may form part of the exterior area 240 and define openings 272, 274 of first layer 224, they may nevertheless indicate where interior area 244 ends and the second layer 228 continues in one dimension. As another example, the exterior and interior areas 240, 244 may be coextensive at a first and second groups 286, 290 of interlayer knit stitches, e.g., at course-wise boundaries of the exterior area 240.

Referring to detail view 294, an interlayer knit stitch may exist where at least one yarn of the first layer 224 may interloop with at least one yarn of the second layer 228, thereby preventing the first and second layers 224, 228 from separating at the location of the interlooped yarns. For example, the first group of interlayer knit stitches 286 may exist at an interface between the second surfaces 252, 260 of the exterior and interior areas 240, 244. This connection may result directly from the knitting process. In other words, the connection may be continuous in that the yarns and/or strands of the first layer 224 and/or the second layer 228 are sufficient to join the two layers. Said differently, no post-knitting steps are necessary to join the first layer 224 with the second layer 228 at the location of the interlayer knit stitches. This form of connection may advantageously save materials, cost, manufacturing time, and weight as compared to other connection forms. In some embodiments, multiple yarns of first layer and/or multiple yarns of second layer may be interlooped. The first and second groups of interlayer knit stitches 286, 290 may form an interlayer knit stitch line, but need not necessarily form a line, as they may be placed in a non-linear arrangement (e.g., a pattern over an area). In the embodiment of FIG. 3, the first and second groups of interlayer knit stitches 286, 290 may form interlayer knit stitch lines having a wale-wise orientation; however, in other embodiments, interlayer knit stitch lines may have other orientations, e.g., a course-wise orientation. To clarify, on one side of the first or second group of interlayer knit stitches 286, 290, the exterior and interior areas 240, 244 may exist and be freely separable. At the first and second groups of interlayer knit stitches 286, 290, the exterior and interior areas are coextensive and the first and second layers 224, 228 are inseparable. On another side of the first and second groups of interlayer knit stitches 286, 290, the first and second layers 224, 228 may be inseparable (e.g., if joined by additional interlayer knit stitches), or may be freely separable (e.g., if not joined by additional interlayer knit stitches). In the detail of view 294 of FIG. 3, the first and second layers 224, 228 are inseparable beyond the first group of interlayer knit stitches 286, 290. Regardless, interlayer knit stitches (e.g., the first and second groups 286, 290) may indicate where the exterior and interior areas 240, 244 end in one dimension and continuously transition into the first and second layers 224, 228, respectively.

Referring still to FIG. 3, the exterior area 240 may include one or more courses of yarns and/or strands that extend continuously into the first layer 224. In other words, one or more courses of yarns and/or strands forming the exterior area 240 may have an orientation that is approximately perpendicular to the passageway 232 formed between the exterior and interior areas 240, 244. These courses of yarns and/or strands may experience tensile forces as a result of pulling or stretching the exterior area 240, and may advantageously transfer those tensile forces to the first layer 224, where they can be absorbed. To facilitate force transfer to the first layer 224, among other benefits, at least a portion of the exterior area 240 may have multi-bed construction. As compared to single-bed knit structures, multi-bed construction may advantageously provide greater strength, stretch resistance, and resistance to rolling at the edges. Such construction may provide further advantages by obviating the possible need to incorporate additional elements into the knitted component 108 or article 100 (for example, tensile strands inlaid into the knitted component 108 as part of a fastening system), thereby further reducing weight and cost.

Exemplary multi-bed knit structures suitable for the exterior area 240 include double jersey, interlock, rib knits (e.g., 1×1 and 2×1), and other structures as described above. The exterior area 240 may include a plurality of knit structures, including at least one multi-bed knit structure. For example, the exterior area 240 may include certain courses having interlock construction, and may also include courses knitted on a single needle bed that include floats in order to enhance stretch resistance.

To further facilitate transfer of tensile forces to the first layer 224, the exterior area 240 may include courses of yarn and/or strands having relatively low stretch, for example a polyester yarn. For example, the exterior area 240 may be formed of a high tenacity yarn with relatively high tensile strength and resistance to surface abrasion, and relatively low stretch. Additionally or alternatively, the exterior area 240 may include one or more courses of a monofilament strand, which may offer weight savings as compared to multi-filament yarns. Monofilament strands may also provide reduced-friction surface properties, which may advantageously facilitate the movement of elements (e.g., a lace) within the passageway 232 formed by the exterior and interior areas 240, 244. Additionally or alternatively, one or more of the yarns or strands forming the exterior area 240 may include thermoplastic material, such as a monofilament strand plated with thermoplastic polyurethane. When yarns or strands containing thermoplastic material are heated beyond a phase change threshold (e.g., in a post-knitting process), the thermoplastic portion of those yarns melt and integrate into surrounding yarns. Upon cooling below the phase change threshold, the thermoplastic material solidifies again, thereby strengthening portions by binding filaments together and creating a force-resistive fused area.

The interior area 244 may include one or more courses of yarns and/or strands that extend continuously into the second layer 228. In other words, one or more courses of yarns and/or strands forming the interior area 244 may have an orientation that is approximately perpendicular to the passageway 232. In some embodiments, at least a portion of the interior area 244 may have multi-bed construction, but because it may be less likely that the interior area 244 will experience tensile forces as great as exterior area 240, in other embodiments the interior area 240 may substantially have single-bed knit construction.

Although it may be less likely to experience high tensile forces, the interior area 244 may nevertheless be knitted under some positive tensile force, may be knitted to resist tensile forces, and/or may be knitted to bias the knitted loop structure 204 to a contracted state. This characteristic may impart a desirable level of resilience to the knitted loop structure 204, and may cause the exterior area 240 to form a more pronounced loop. To effect this functionality, the interior area 244 may include one or more elasticated yarns with relatively high stretch. Suitable elasticated yarns may incorporate elastane fiber(s), such as those available from E.I. duPont de Nemours Company under the LYCRA trademark. Such yarns may have the configuration of covered LYCRA, for example yarns having a LYCRA core that is surrounded by a nylon sheath. Other fibers or filaments exhibiting elastic properties may also be utilized. Additionally or alternatively, either the exterior or interior areas 240, 244 may include one or more courses knitted with thermoplastic yarns, e.g., thermoplastic polyurethane yarns, or yarns or strands of other materials sheathed in thermoplastic (such as a monofilament strand sheathed with thermoplastic polyurethane). To clarify, either of the exterior or interior areas 240, 244 may embody any combination of the aforementioned exemplary materials and additional materials appropriate for forming a knitted component.

In use, the knitted component 108 of FIG. 3 may form at least part of an upper of an article of footwear, such as the article 100 of FIG. 1, and may include one or more knitted loop structures 204 as described above. The knitted loop structures 204 may eventually be located on a medial and/or lateral side 132, 136, and in the forefoot region 120, midfoot region 124, and rearfoot region 128 of the article 100. The one or more knitted loop structures 204 may receive a lace 236, strand, strap, or other object through passageways 232 formed by the exterior and interior areas 240, 244. The loop structures 204 and lace 236, strand, strap, or other object may form part of a fastening system that helps secure a wearer's foot within a void 116 formed by the knitted component 108.

In use, when a wearer pulls on one end of the lace 236 (or strand, strap, or other object), it may slide within the passageway 232 of the knitted loop structure 204. If the loop structure 204 is knitted at least partially with monofilament strands or other low-friction materials, it may reduce the input force required to tighten the fastening system. Additionally, pulling the lace 236 may exert a force on the loop structure 204, which pulls the loop structure 204 in an outward direction. This movement may create a tensile force within the knitted loop structure 204. However, because the exterior area 240 of the knitted loop structure may have multi-bed knit construction, may include courses of yarns and/or strands that extend continuously into the first layer 224, and may be knitted from yarns and/or strands that resist stretch, the exterior area 240 may efficiently transfer this tensile force to the first layer 224 without damaging or stretching the exterior area 240, even after many repeated uses. Thus, the knitted loop structure 204 may offer exceptional resistance to stretching and breakage.

Figure 7:
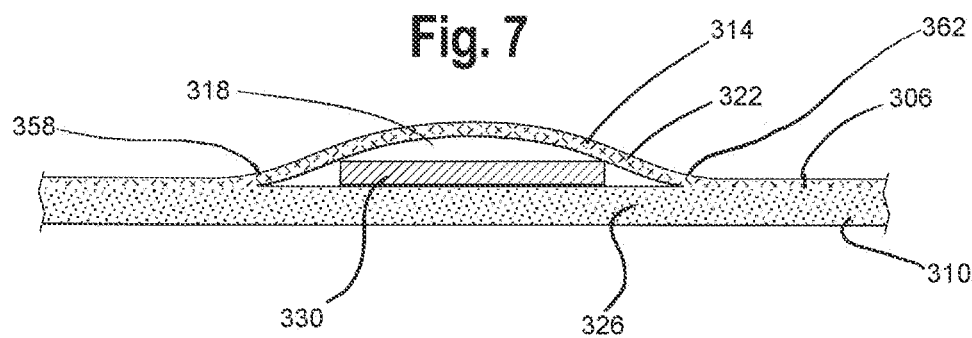
FIG. 7 depicts a section view of the knitted loop structure of FIG. 2, 6.

Referring now to FIGS. 6 and 7, the second zone 208 of the integral one-piece knitted component 108 of FIG. 2 may have a first layer 306 (which may eventually correspond to an exterior of the article 100) and a second layer 310 (which may eventually correspond to an interior of the article 100), which together may form a knitted loop structure 314 having a course-wise oriented passageway 318 (as compared with the wale-wise passageway 232 of the knitted loop structure 204 illustrated in FIG. 3). Except as described herein, the embodiment of FIG. 6 may generally share the knit structure, materials, and other qualities of the embodiment of FIG. 3.

In the embodiment of FIG. 6, the first layer 306 may have a knitted exterior area 322, and the second layer 310 may have a multi-bed knitted interior area 326. The exterior and interior areas 322, 326 may form the integral knitted loop structure 314. The knitted component 108 of FIG. 2 may include one or more of such integral loop structures 314, for example, on the medial and lateral sides 192, 196 of the midfoot region 184. Like the knitted loop structures 240 *a*, *b* of FIG. 3, the knitted loop structure 314 of FIG. 6 may eventually form part of a fastening system. For visualization purposes, FIG. 7 illustrates a strap 330 passing through the loop structure 314, such as may be used to secure a wearer's foot in the article 100 of FIG. 1. The exterior area 322 may overlap and be freely separable from the interior area 326. Similar to the embodiment of FIG. 3, at least one of the exterior and interior areas 322, 326 may have multi-bed knit construction to impart strength, stretch resistance, and roll resistance—in this case, the interior area 326 may have multi-bed construction. The exterior area 322 may be freely separable from the interior area 326 along a first edge and a second edge 334, 338, which may form at least part of first and second openings 342, 346 in the first layer 306. The first and second edges 334, 338 may each have a substantially wale-wise orientation (as compared with the generally course-wise first and second edges 264, 268 of FIG. 3). Each of the first and second edges 334, 338 may correspond with a first and second binding area 350, 354, as described above. The binding areas 350, 354 may include one or more stitches designed to increase strength and durability, for example a plurality of stitches of a thermoplastic polyurethane yarn which may form a fused area when subjected to a post-knitting heat treatment.

As the first and second edges 334, 338 of the exterior area 322 may have a wale-wise orientation and therefore run across at least one course of yarn, there may be a discontinuity between courses of the exterior area 322 and courses of the first layer 306. Said differently, the first and second edges 334, 338 may form the end points of courses of yarn forming the exterior area 322. Thus, in the embodiment of FIG. 6, courses of yarn of the exterior area 322 may not extend continuously into the first layer 306, as compared with the embodiment of FIG. 3, where courses of the exterior area 240 may extend continuously into first layer 224. Rather, the exterior area 322 of FIG. 6 may be continuously interconnected with the first layer 306 by one or more groups of interlayer knit stitches at wale-wise boundaries 358, 362 (e.g., where one course of the exterior area 322 interloops with at least one adjacent course of the first and/or second layers 306, 310).

In use, the knitted loop structure 314 of FIG. 6 may form part of a fastening system of an article of footwear, or another system. Accordingly, the exterior area 322 may be formed of multi-bed knitted construction to better withstand forces. However, if the knitted loop structure 314 is unlikely to experience significant tensile forces in its application, then exterior area 322 may have a single-bed knit construction to reduce weight and cost. Rather, the interior area 326 may have multi-bed construction as shown in FIG. 7, which may provide greater cushion against a wearer's foot, or other advantage.

Referring now to FIG. 8A-11, a knitted component 366 may be knitted in three dimensions, and may include freely separable and overlapping areas having multi-bed knit construction, like the embodiments of FIGS. 2-7. The knitted component 366 may resemble a bootie or a sock, i.e., forming an opening 370 and defining a void approximating the shape of a human foot. The knitted component 366 may include an overfoot portion 374 and underfoot portion 378, and may further include a forefoot region 382, a midfoot region 386, and a rearfoot region 390. The foregoing portions and regions may be knitted integrally in a single knitting process, i.e., without any significant post-knitting steps necessary to form the knitted component 366 into a bootie or sock that defines a foot-shaped void. In particular, the overfoot portion 374 may be knitted together with the underfoot portion 378 around a perimeter 394 of the underfoot portion 378, e.g., with one or more interlayer knit stitches as described above. In particular, the overfoot portion 374 may be joined with the underfoot portion 378 at an interlayer knit stitch line 398 around the perimeter 394 of the underfoot portion 378. In some embodiments, a small number of additional stitches of the overfoot portion 374 may extend past the interlayer knit stitch line 398, creating a small overhang of overfoot portion 374 stitches that may conceal the interlayer knit stitch line 398. The three-dimensional foot-shaped knit construction of the knitted component 366 of FIGS. 8-10 may advantageously provide greater comfort to a wearer due to the significant reduction of post-knitting steps and structures (e.g., seams). Additionally, this knit construction may reduce product cost by eliminating one or more time- and material-consuming post-knitting steps. As described below, this knit construction may offer additional advantages stemming from the use of multi-bed knit construction in one or more zones.

The knitted component 366 of FIG. 8 may include numerous zones having different materials, knit constructions, and physical properties. For example, an upper collar zone 402 may define the opening 370 for receiving a wearer's foot, and may include a front upper collar zone 406 having an interior surface 410 oriented toward the opening 370, overlapping a rear upper collar zone 414 having an interior surface 418 also oriented toward the opening 370. The front upper collar zone 406 may overlap and be coextensive with the rear upper collar zone 414 as a result of the knitting process, as illustrated in FIG. 9, taken along section line 9-9.

The knitted component 366 of FIG. 8 may also include one or more zones having two or more freely separable and overlapping knitted areas, with at least one area having multi-bed knit construction. For example, the upper collar zone 402 may transition into a lower collar zone 422, which may include a multi-bed front lower collar zone 426 overlapping a multi-bed rear lower collar zone 430 as shown in FIG. 10, taken along section line 10-10. The lower collar zone 422 may continuously transition into a heel zone 434 and a vamp zone 438. The vamp zone 438 may have multi-bed knit construction and may substantially cover part of the overfoot portion 374 of the knitted component 366 corresponding with the top part of a wearer's foot in the midfoot region 386. The vamp zone 438 may continuously transition into a toe zone 442. The heel zone 434, vamp zone 438, toe zone 442, and other zones may be adjacent to and knitted continuously with an underfoot zone 446 (which may correspond with the underfoot portion 378), e.g., along one or more interlayer knit stitch lines. The heel zone 434, vamp zone 438, toe zone 442, underfoot zone 446, and other zones may each have an interior surface oriented toward the void. For example, the vamp zone 438 may transition continuously into the underfoot zone 446 at interlayer knit stitch line 398, where at least one yarn of vamp zone 438 interloops with at least one yarn of underfoot zone 446, e.g., at an interface between the interior surfaces of the vamp and underfoot zones 438, 446.

Certain of the foregoing zones may overlap one another as a result of the knitting process. For example, the vamp zone 438 may overlap the underfoot zone 446 as shown in FIG. 11, taken along section line 11-11. Or, at another location in knitted component 366, the vamp zone 438 and the toe zone 442 may overlap with the underfoot zone 446.

The different zones of the knitted component 366 may have different properties, different materials, and different knit structures. In particular, in instances where one zone overlaps another zone, at least one zone may have multi-bed knit construction. This may advantageously provide greater zonal cushioning, durability, stretch resistance, or other characteristics.

Referring to FIG. 9, the front upper collar zone 406 and rear upper collar zone 414 may be knitted substantially simultaneously and may be joined at interlayer knit stitch areas 450, 454, 458, 462, which may each include at least one instance of a yarn of the front upper collar zone 406 being interlooped with a yarn of the rear upper collar zone 414, e.g., at an interface between the interior surfaces 410, 418. The interlayer knit stitch areas 450, 454, 458, 462 therefore may connect the front upper collar zone 406 in an overlapping spatial relationship with the rear upper collar zone 414 without a post-knitting connection (e.g., a seam). Front upper collar zone 406 may include an outer layer 466 that is freely-separable from an inner layer 470. The freely-separable outer and inner layers 466, 470 may move relative to each other in use, e.g., for the advantage of reducing friction experienced by a wearer. Rear upper collar zone 414 may also include an outer layer 474 freely separable from an inner layer 478. The outer and inner layers of the front and rear upper collar zones 406, 414 may have less-than-full gauge single-bed construction, e.g., one-third gauge construction (loops formed on every third needle of one needle bed). Thus, the upper collar zone 402 may include four overlapping and freely separable layers knitted substantially simultaneously, for example on a two needle bed knitting machine. Although this knit structure is depicted in the collar zone, it may be knitted into other areas of the knitted component 366.

Referring now to FIG. 10, the front lower collar zone 426 and rear lower collar zone 430 of knitted component 366 may be knitted substantially simultaneously and may be joined at interlayer knit stitch areas 482, 486, and consequently overlap each other Like the front upper collar zone 406, front lower collar zone 426 may include an outer layer 490 and an inner layer 494 that are freely separable initially. As a result of the knitting process however, the outer and inner layers 490, 494 may form a first area 498 with multi-bed construction. This may be accomplished during the knitting process by knitting the outer layer 490 as a single-bed layer (on a first needle bed) and the inner layer 494 as a single-bed layer (on a second needle bed), and subsequently transferring at least one loop of the outer layer 490 from the first needle bed to the second needle bed and then knitting additional courses on the second needle bed. Thus, the outer and inner layers 490, 494 may form a multi-bed knitted layer. The rear lower collar zone 430 may have similar construction as the front lower collar zone 426. Although this knit structure is depicted in the lower collar zone 422, it may be knitted into other areas of the knitted component 366.

Referring now to FIG. 11, the vamp zone 438 may be knitted substantially simultaneously with the underfoot zone 446, and may overlap the underfoot zone 446 yet remain freely separable. To impart additional cushioning or stretch resistance, to provide an appealing aesthetic, or for other advantage, the vamp zone 438 may have multi-bed knit construction and the underfoot zone 446 may have single-bed construction, or vice versa. For example, the vamp zone 438 may have at least one course of a first yarn having a multi-bed construction, e.g., double jersey. The at least one multi-bed course may have a less-than-full gauge stitch density over the entire course, e.g., half gauge. The vamp zone 438 may also include courses of a second yarn, a third yarn, and optionally additional yarns, e.g., to impart different visual characteristics or technical properties to the vamp zone 438. The additional courses may generally have less-than-full gauge construction. The underfoot zone 446 may include courses of a fourth yarn having a single-bed knitted construction with a less-than-full gauge construction, e.g., one-fourth gauge construction (i.e., knitted on every fourth needle).

Figure 12:
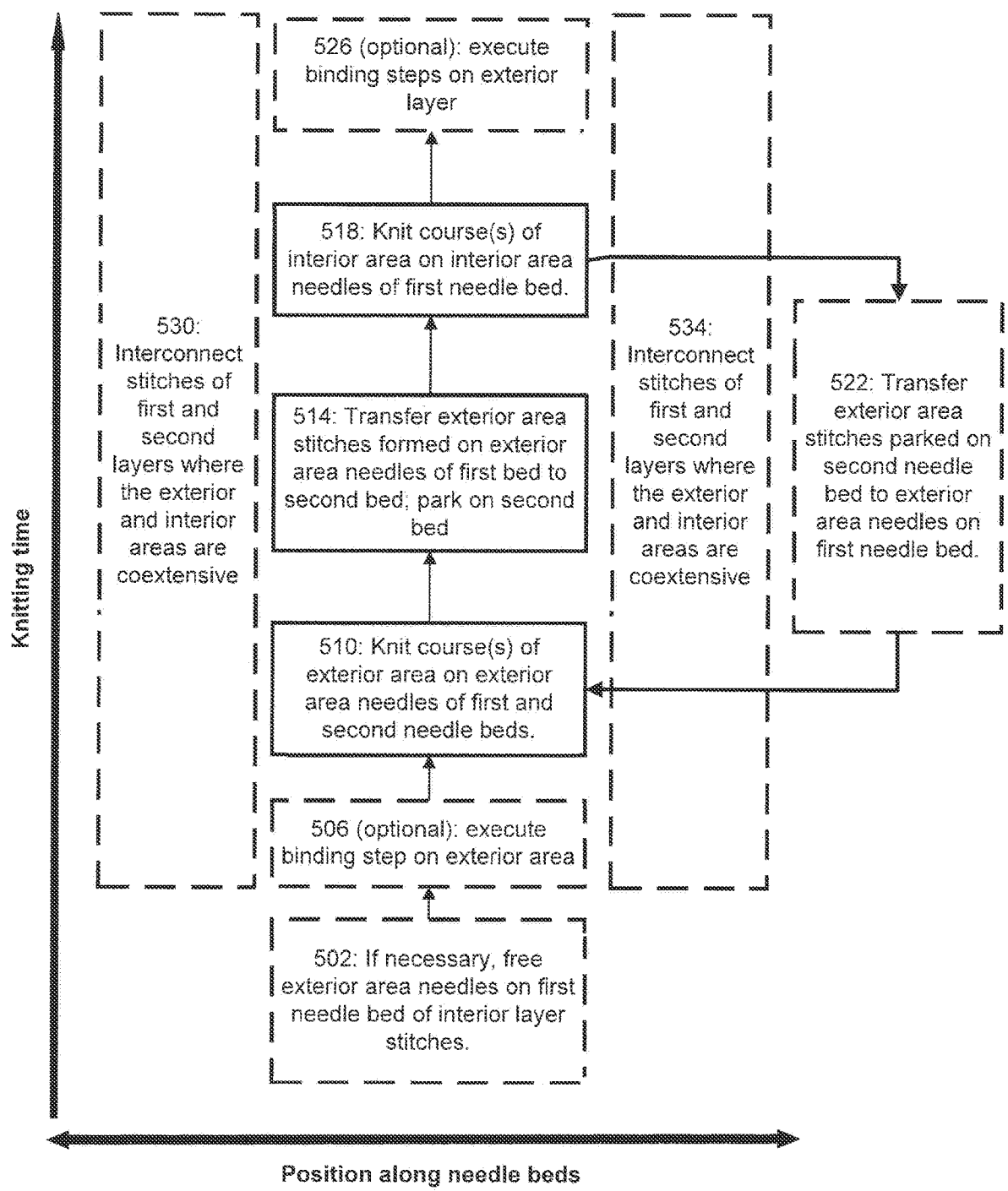
FIG. 12 schematically illustrates methods for forming a knitted component.

FIG. 12 schematically depicts exemplary methods of knitting a portion of a knitted component as shown in FIGS. 1-5 on a knitting machine, e.g., a two needle bed weft knitting machine. In particular, a knitted component may have a first layer having an exterior area with multi-bed knitted construction, and a second layer having an interior area. The exterior area may overlap the interior area as a result of the knitting process, the exterior area and the interior area may be freely separable and form a passageway, and the exterior area may have first and second edges with a course-wise orientation. The exterior and interior areas may be coextensive at first and second groups of interlayer knit stitches. While the description below contemplates an exterior area having multi-bed knitted construction, it shall be understood that substantially the same procedure may form a knitted component having an interior area with multi-bed construction instead of the exterior area.

Throughout this process, the term interior area needles refers to needles on a first and a second needle bed that are primarily utilized for knitting the interior area, and the term exterior area needles refers to needles on the first and second needle beds that are primarily utilized to knit the exterior area. In addition, exterior area needles may include needles on which stitches of the exterior area are transferred and "parked." Generally, exterior and interior area needles may exist within the same span of a needle bed, although interior area needles generally differ from exterior area needles. As one example, exterior area needles may include all needles on the rear needle bed and even-numbered needles on the front needle bed, whereas the interior needles may include odd-numbered needles on the front needle bed. In such a case, stitches of the exterior area may be knitted on odd-numbered needles of the rear needle bed and even-numbered needles of the front needle bed (which may periodically be transferred to and parked on even-numbered needles of the rear needle bed).

Referring to FIG. 12, at step 502, exterior area needles on a portion of the first needle bed may be freed of interior area stitches, if necessary. This may be accomplished by transferring interior area stitches present on those needles (e.g., loops or tucks) to non-exterior area needles (e.g., interior area needles). Next and optional binding step 506 may include knitting at least one course forming a first edge of the exterior area, which edge may form at least part of an opening in the first layer. The binding step 506 may also include a sequence of transfers that move stitches of the exterior area and the interior area on the same needles, and also to pull those stitches in a course-wise direction. To enhance durability, stretch resistance, resistance to unravelling, and other properties, the course(s) knitted during the binding step may have gradually increasing width, and may be knitted from a yarn or strand with relatively high tenacity and/or stretch resistance. Notably, the exterior area is freely separable from the interior area at the first edge. Next, at step 510, one or more multi-bed courses of the exterior area are knitted on exterior area needles of the first and second needle beds. The multi-bed knit construction may impart a level of durability and stretch resistance to the exterior area. Optionally, one or more single-bed courses of the exterior area may also be knitted on exterior area needles during this step. Notably, courses of the exterior area may extend continuously into the first layer on either or both sides of the exterior area. That is, a single course of yarn may form part of the first layer, then part of the exterior area, and then form another part of the first layer. Thus, the first layer may continuously transition to and from the exterior area. Next, at step 514, stitches of the exterior area (e.g., loops, tucks, and floats) previously formed on exterior area needles of the first needle bed are transferred to, and parked on, exterior area needles of the second needle bed. As a result of this step, substantially all of the exterior area stitches knitted at step 510 on the first needle bed are parked on the second needle bed, thereby freeing the first needle bed for knitting of the interior area. Next, at step 518, one or more courses of the interior area may be knitted on interior area needles of the first needle bed. Notably, these interior area courses overlap with but may not interloop with exterior area courses because the exterior area courses knitted during step 510 were parked on the second needle bed at step 514. Thus, the exterior area courses remain freely separable from the interior area courses. Also, courses of the interior area may extend continuously into the second layer on either or both sides of the interior area. That is, a single course of yarn may form part of the second layer, then part of the interior area, and then another part of the second layer. Thus, the second layer may continuously transition to and from the interior area.

After step 518, if additional knitting height of the exterior and interior areas is desired, then optional step 522 may be executed, wherein stitches of the exterior area previously parked on the second needle bed at step 514 may be returned to exterior area needles of the first needle bed, and steps 510, 514, and 518 may be repeated. For example, if it is desired for the exterior area to have a knitting height of twenty (20) courses (excluding binding courses), and step 510 knits four (4) courses of the exterior area each time it is executed, then steps 510, 514, 518, 522 may be repeated five (5) times in order for the exterior area to achieve the desired twenty-course knitting height. After the desired knitting height is achieved, then optional binding step 526 may be executed to form a second edge of the exterior area, where the exterior area and interior area remain freely separable.

Separately and substantially simultaneously with steps 506-526, steps 530, 534 may be executed, whereby interlayer knitted stitches may be formed to connect the first and second layers, thereby defining where the exterior and interior areas may be coextensive. This connection may include at least one instance where at least one yarn of the first layer interloops with at least one yarn of the second layer at or adjacent an interface between opposing surfaces of the exterior and interior areas. A plurality of interlayer knitted stitches may form an interlayer knit stitch line, although the interlayer knit stitches do not necessarily form a line, as they may be placed in a nonlinear arrangement (e.g., placed in a pattern over an area) in order to join the first layer with the second layer. To clarify, the exterior area may be freely separable from the interior area up to an interlayer knit stitch, interlayer knit stitch line, or interlayer knit stitch area. Thus, the interlayer stitch or stitch line may indicate where one dimension of the exterior and interior areas end and continuously transition into the first and second layers, respectively.

FIGS. 13A-G illustrate a knitting diagram corresponding to one method of knitting a knitted component as shown in FIGS. 2-4 and described in FIG. 12. In particular, FIGS. 13A-G illustrate exemplary steps undertaken on a two needle bed weft knitting machine to knit a knitted component (e.g., a knitted loop structure) that may have a first layer having an multi-bed exterior area, and a second layer having an interior area, where the exterior area overlaps the interior area, where the exterior area and the interior area may be freely separable and form a passageway, and where the exterior area may have first and second edges with a course-wise orientation.

Figure 13A:
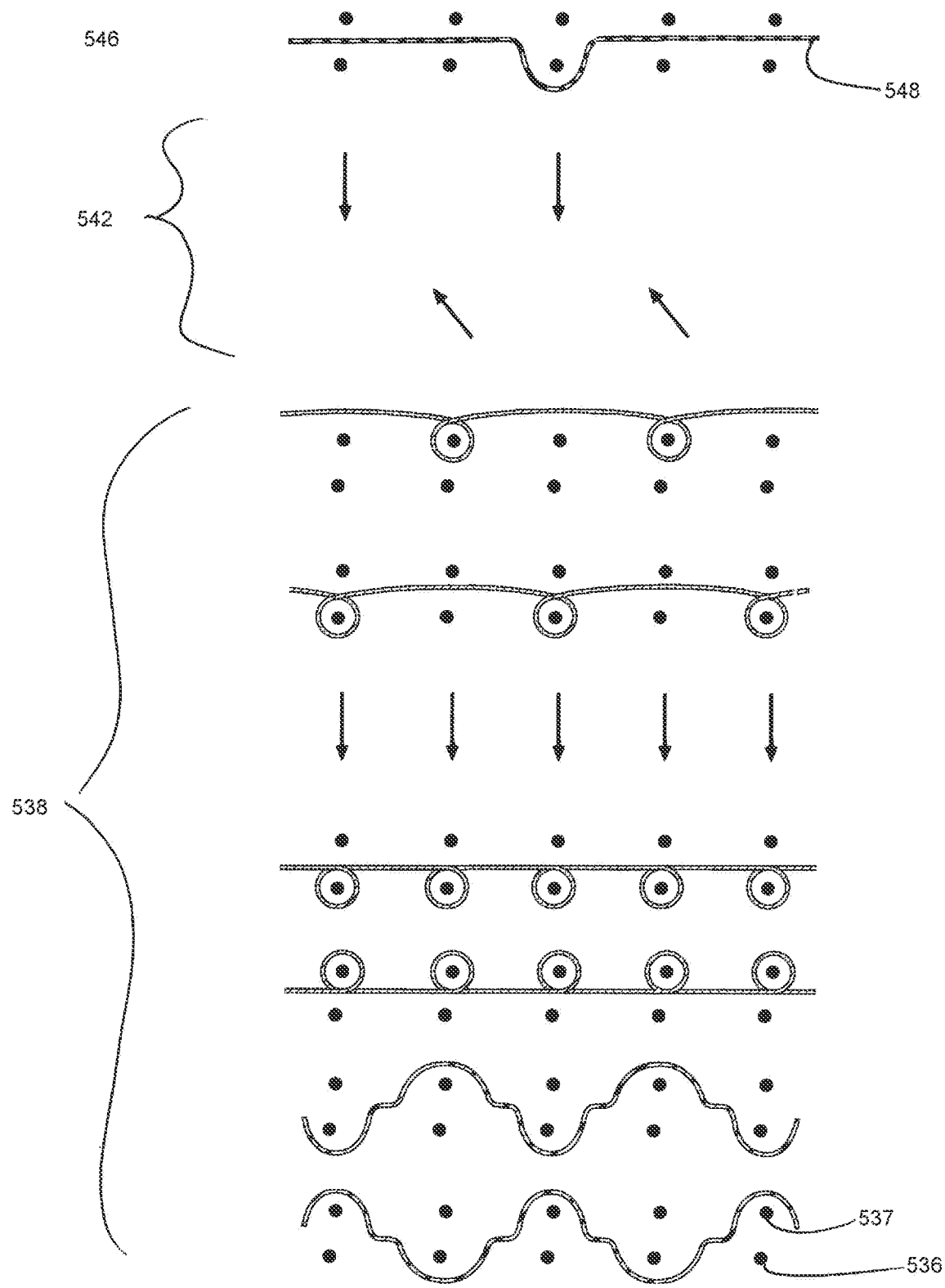
Figure 13D:
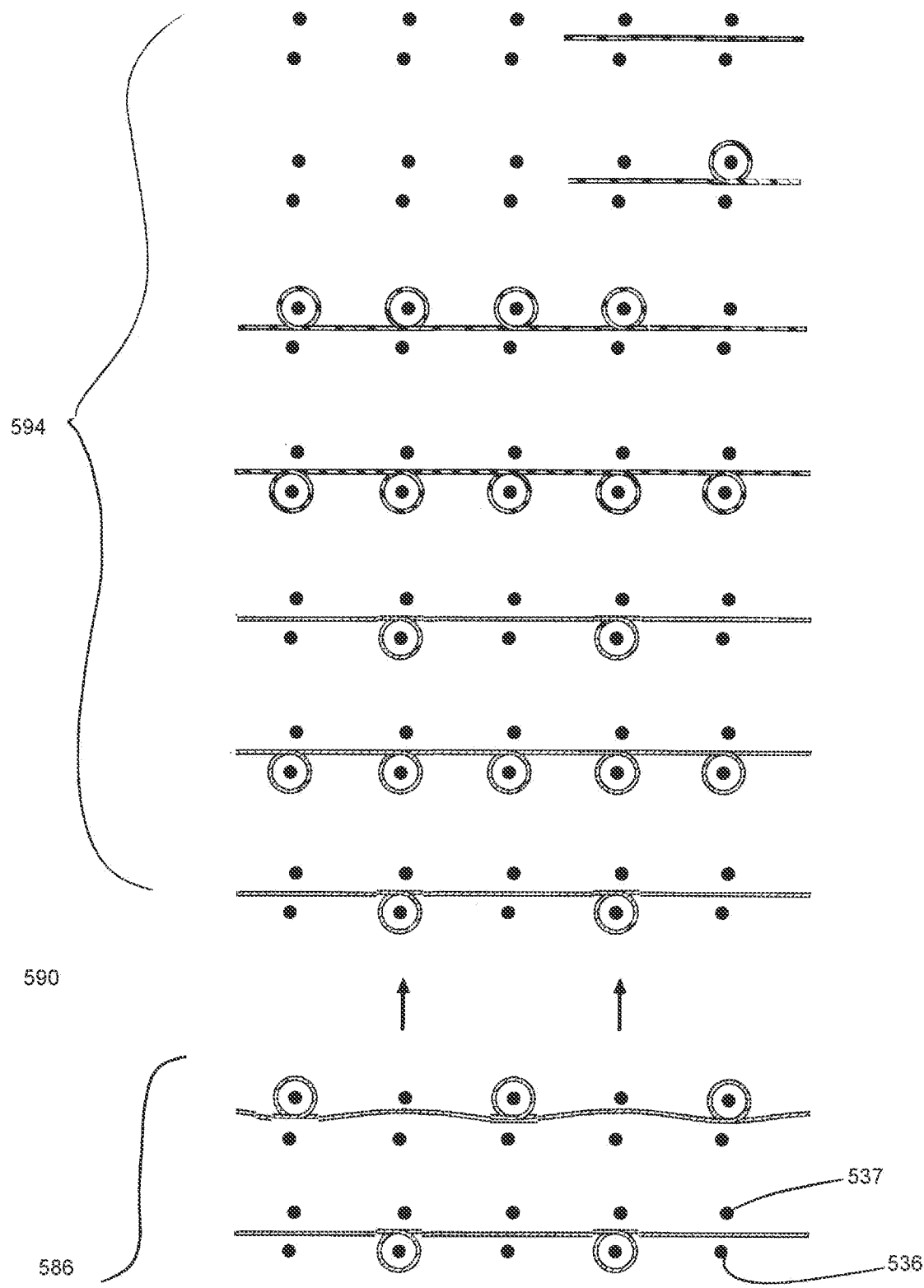

Referring to FIG. 13A, a two needle bed weft knitting machine has a front needle bed 536 and a rear needle bed 537. Each of the front and rear needle beds 536-537 has needles 1-5. In this embodiment, exterior area needles may correspond with even needles of front needle bed 536 and odd needles of rear needle bed 537. At step 538, the knitting machine knits courses of the first and second layers before commencing knitting of the exterior or interior areas. At step 542, the knitting machine transfers loops or stitches present on the even front bed needles to odd front bed needles, i.e., the machine clears exterior area needles on the front needle bed 536. At (optional) step 546, the knitting machine begins knitting the interior area by tucking one course of a first yarn 548 of the interior area on an odd front bed needle. The first yarn 548 may be an elasticated yarn, e.g., to impart resilience or recovery to the knit component. Although not shown in FIG. 13A-G, binding steps may optionally be executed at this point, similar to those discussed below with respect to step 594.

Referring to FIG. 13, at step 550, the knitting machine knits courses of a second yarn 552 of the exterior area. Note that at least one course of step 550 is knitted on both the even needles of the front needle bed 536 and on the rear needle bed 537. Such multi-bed construction imparts strength, stretch resistance, and roll resistance to the exterior layer. The second yarn 552 may be a high tenacity yarn, a monofilament yarn, or other yarn with relatively high tensile strength and stretch resistance. At (optional) step 554, the knitting machine knits courses of a third yarn 556 of the exterior area on the front needle bed 536 (even needles only) and the rear needle bed 537 (i.e., multi-bed construction). The inclusion of third yarn 556 may impart advantageous properties to the exterior area. For example, third yarn 556 may be a yarn or strand sheathed in thermoplastic polyurethane, which may undergo a post-knitting heat treatment to form a fused area for additional strength.

At step 558, the knitting machine transfers tucks and loops of the exterior area formed on even front bed needles to opposite rear-bed needles. This step enables the knitting machine to resume knitting of the interior area on the front needle bed 536 without interlooping courses of the interior area with courses of the exterior area, i.e., to keep the interior area freely separable from the exterior area. Following step 558, substantially all stitches of exterior area formed during steps 550-554 are parked on the rear needle bed 537.

At step 562, the knitting machine knits courses of a fourth yarn 564 and the first yarn 548 of the interior area on odd front bed needles. The fourth yarn 564 may be the same as other yarns, or it may differ. For example, the fourth yarn 564 may be a yarn or strand sheathed in thermoplastic polyurethane, which may undergo a post-knitting heat treatment to form a fused area for additional strength.

Following step 562, substantially all stitches of the exterior area formed during steps 550554 are located on the rear needle bed 537 and substantially all stitches of the interior area formed during step 562 are located on the front needle bed 536. At this time, if no additional knitting height is desired, binding steps may be executed to gradually knit the exterior layer into the interior layer and to impart additional strength and unravelling resistance to the exterior layer.

Referring to FIG. 13C now, if additional knitting height is desired, then steps 566-570 may be executed. At step 566, the knitting machine transfers tucks and loops of the exterior area previously parked on the rear needle bed 537 at step 558 to even needles of the front needle bed 536. This step enables the knitting machine to resume knitting the exterior area on exterior area needles of both needle beds 536-537. Because the even needles on the front needle bed 536 are free of stitches forming the interior area, courses of the exterior area knitted on those needles subsequent to the transfer at step 566 will not interloop with courses of the interior area.

At step 570, the knitting machine may knit additional courses of the second yarn 552 and third yarn 556 of the exterior area. Courses knitted during step 570 may be the same as other courses of the exterior area, or may differ in order to impart certain characteristics to the exterior area. For example, courses knitted during step 570 may have single bed construction and/or may include floats to impart stretch resistance.

At step 574, the knitting machine again transfers tucks and loops of the exterior area formed on even front bed needles to opposite rear needle bed needles. This step enables the knitting machine to either resume knitting of the interior area without interlooping the interior area with the exterior area, or to commence binding steps. Following step 574, substantially all stitches of exterior area formed during step 570 are parked on the rear needle bed 537.

If additional knitting height is desired following step 574, then steps 562, 566, 570 may be repeated, or steps 578, 582, 586, 590 may be carried out. At step 578, the knitting machine may knit additional courses of the interior area on odd front bed needles. The additional courses may include courses of the fourth yarn 564, e.g., knitted with floats for stretch resistance, but may additionally or alternatively include courses of the first yarn 548 or additional yarns. At step 582, the knitting machine may transfer tucks and loops of the exterior area previously parked on the rear needle bed 537 at step 574 to even needles of the front needle bed. This step enables the knitting machine to resume knitting the exterior area on exterior area needles of both needle beds. At step 586, the knitting machine may knit additional courses of the third yarn 556 of the exterior area on the front needle bed 536 (even needles only) and the rear needle bed 537 (i.e., multi-bed construction). Although step 58 illustrates three courses, this step may include a lesser or greater number of courses. At step 590, the knitting machine may again transfer tucks and loops of the exterior area formed on even front bed needles to the rear needle bed 537 to enable the knitting machine to either resume knitting of the interior area without interlooping the interior area with the exterior area, or to commence binding steps.

If no additional knitting height is desired following step 574 or step 590, then binding step 594 may be executed to bind the edge of the exterior area. The binding step may include gradually shortening courses of the exterior area knitted on the rear needle bed 537 (e.g., courses of second yarn 552), in addition to a sequence of transfers that bind the stitches of the exterior area, transfer the interior area stitches on the same needles, and also pull those stitches in a course-wise direction toward a location where the first and second layers may be interconnected with interlayer knit stitches. Such a binding step may preserve the passageway formed by the freely separable exterior and interior areas and also transition the knit structure into a location where the first and second layers may be inseparable. Binding step 594 may also impart strength and unravelling resistance to the exterior area. Following binding step 594, the loop structure may be substantially complete.

To interconnect the first and second layers, the knitting machine may form interlayer knit stitches as described above. As one example (not shown in FIGS. 13A-G), a yarn feeder corresponding to a yarn of the first layer and exterior area (e.g., a feeder corresponding to the second yarn 552) may form at least one stitch on the rear needle bed 537 and also on the front needle bed 536 where stitches of a yarn corresponding to the second layer and interior area reside (e.g., the fourth yarn 564). This may cause courses of the first layer to become interlooped with courses of the second layer, thereby forming an interlayer knit stitch. As a result, the first layer would become inseparable from the second layer at the location of the interlayer knit stitch, which point may also indicate where the exterior and interior areas are coextensive.

Figure 14:
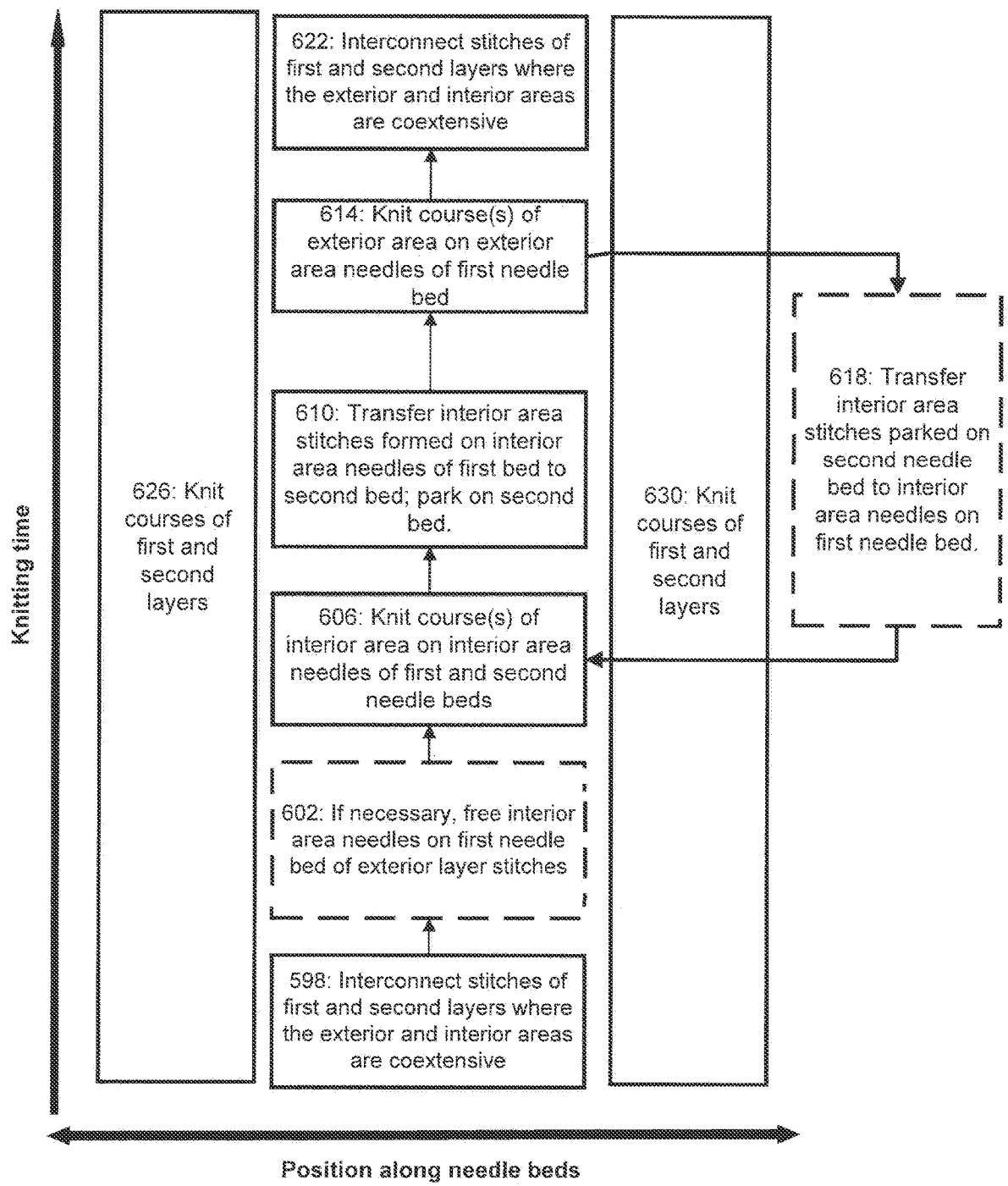
FIG. 14 schematically illustrates additional methods for forming a knitted component.

FIG. 14 schematically depicts exemplary methods of knitting a portion of a knitted component as shown in FIGS. 1-2, 6-7, in particular, a knitted component having an interior area with multi-bed knitted construction overlapping a freely separable exterior area as a result of the knitting process, where the interior and exterior areas form a passageway having a course-wise orientation. Furthermore, the exterior area may have first and second edges along course-wise boundaries, each edge forming at least part of an opening in the first layer. For example, the first and second edges may have a wale-wise orientation and therefore run across at least one course of yarn, creating a discontinuity between courses of the exterior area and courses of the first layer. In a wale-wise dimension, the exterior and interior areas may be coextensive at interlayer knit stitches between the first and second layers. While the description below contemplates an interior area having multi-bed knitted construction, it shall be understood that substantially the same procedure may produce a knitted component having an exterior area with multi-bed construction instead of the interior area.

Referring to FIG. 14, at step 598, one or more courses of the first and second layers may be interconnected along a wale-wise boundary of the interior and exterior areas, e.g., with interlayer knit stitches as described above. The location of these interlayer knit stitches may compare in function and structure, but differ in location, from the interlayer knit stitches of FIG. 12, which may form a course-wise boundary of the exterior and interior areas.

At step 602, interior area needles on a portion of the first needle bed may be freed of exterior area stitches, if necessary. Next, at step 606, one or more multi-bed courses of the interior area are knitted on interior area needles of the first and second needle beds. The multi-bed knit construction may impart a level of cushion to the interior area. Optionally, one or more single-bed courses of the interior area may also be knitted on interior area needles during this step. Notably, courses of the interior area may extend continuously into the second layer on either or both sides of the interior area. That is, a single course of yarn may form part of the second layer, then part of the interior area, and then another part of the second layer. Thus, the second layer may continuously transition to and from the interior area.

Next, at step 610, stitches of the interior area previously formed on interior area needles of the first needle bed are transferred to, and parked on, interior area needles of the second needle bed. As a result of this step, substantially all of the interior area stitches knitted at step 606 are parked on the second needle bed, thereby freeing the first needle bed for knitting of the exterior area. Next, at step 614, one or more courses of the exterior area may be knitted on exterior area needles of the first needle bed. Notably, these exterior area courses do not interloop with interior area courses because the interior area courses knitted during step 606 were parked on the second needle bed at step 610. Thus, the exterior area courses remain freely separable from the interior area courses. Notably, courses of the exterior area do not extend continuously into the first layer; rather, there is a discontinuity between courses of the first layer and courses of the exterior area.

After step 614, if additional knitting height of the exterior and interior areas is desired, then step 618 may be executed, whereby stitches of the interior area previously parked on the second needle bed at step 610 may be returned to interior area needles of the first needle bed, and steps 606-618 may be repeated. After the desired knitting height is achieved, then following step 614, step 622 may be executed, whereby one or more courses of the first and second layers may be interconnected, e.g., with interlayer knit stitches as described above. The location of these interlayer knit stitches may form another boundary of the exterior and interior areas in a wale-wise dimension.

Separately and substantially simultaneously with steps 598-622, steps 626 and 630 may be carried out, whereby courses of the second layer may extend continuously into the interior area (e.g., using a common yarn feeder), and courses of the first layer may be knitted up to the edges of the exterior area (e.g., using different yarn feeders for the first layer and the exterior area).

Figure 15:
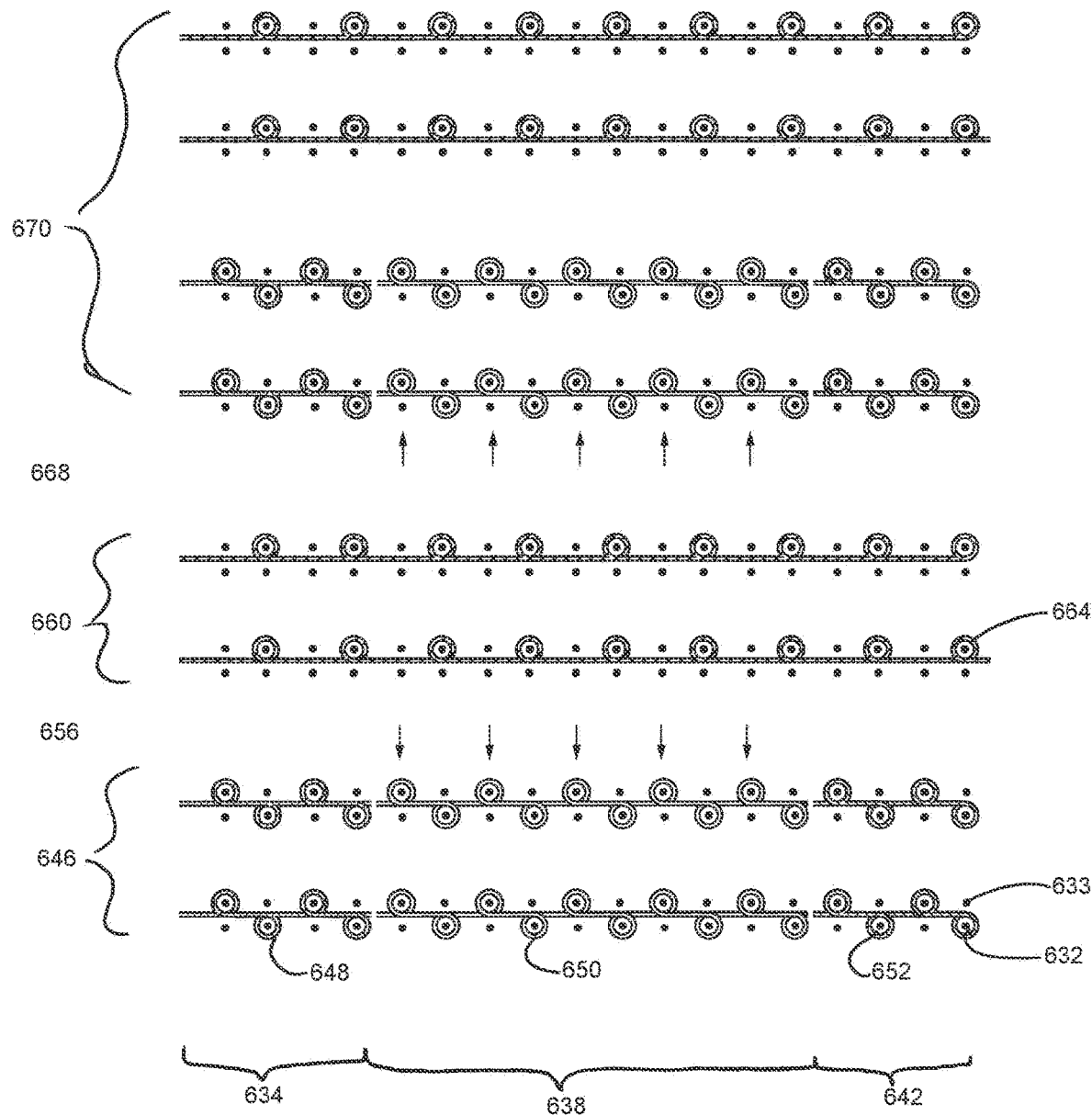
FIG. 15 depicts a knitting diagram corresponding with at least one of the methods of FIG. 14.

FIG. 15 illustrates a knitting diagram corresponding to one method of knitting a similar knitted component as shown in FIGS. 2, 6 and described in FIG. 14. In particular, FIG. 15 illustrates a method to form a knitted component having a first layer including a multi-bed exterior area and a second layer including a single bed interior area, and where the exterior area is freely separable from the interior area along first and second edges at course-wise boundaries, which edges form openings in the first layer. For illustration purposes, eighteen needles are shown on each of a front and rear needle bed 632, 633, and each needle bed is further divided into a first zone 634, a second zone 638, and a third zone 642. The exterior area may be freely separable from the interior area in the second zone 638, and openings in the first layer may exist where the first zone 634 meets the second zone 638, and where the second zone 638 meets the third zone 642. In this embodiment, in the second zone 638, exterior area needles may include even-numbered needles of the front needle bed 632 and odd-numbered needles of the rear needle bed 633. In the first and third zones 634, 642, the first and second layers may be interconnected, for example with interlayer knit stitches as described above.

At an initial step (not shown), the knitting machine frees exterior area needles in the second zone 638 of interior area stitches (e.g., in this case, frees odd rear bed needles and even front-bed needles), after which time stitches of the interior area may reside only on even needles of the rear bed. By freeing odd rear-bed needles, the machine can later utilize those needles to knit the exterior area with double-bed construction while keeping the exterior area freely separable from the interior area.

After freeing odd rear-bed needles, at step 646, a first feeder corresponding to a first yarn 648 may knit at least one partial course of the first layer in the first zone 634, a second feeder corresponding to a second yarn 650 may knit at least one partial course of the multi-bed exterior area on exterior area needles in the second zone 638 (i.e., on odd needles of the rear needle bed and even needles of the front needle bed), and a third feeder corresponding to a third yarn 652 may knit partial courses of the first layer in the third zone 642. The partial courses of the exterior area knitted at step 646 may have multi-bed construction as described above, for example half-gauge double jersey knit construction or other multi-bed knit construction.

Notably, at step 646, courses of the first and third yarns 648 and 652 may not interloop with the second yarn 650; instead, there may be a discontinuity where the first and third yarns 648, 652 abut the second yarn 650. This may necessitate the use of separate yarn feeders for each of the first yarn 648, second yarn 650, and third yarn 652. Therefore, the exterior area may remain freely separable from the first layer at these discontinuities. Over successive courses, successive discontinuities between the first layer and exterior area may form the first and second edges of exterior area, which may form openings in the first layer.

It will be appreciated that step 646 may include a lesser or greater number of courses of the first, second, and third yarns 648, 650, 652 (although two courses are illustrated). Additional courses and yarn types may be knitted as part of step 646 to impart certain properties to the knitted component. For example, the second yarn 650 may have relatively high tenacity and tensile strength, with relatively low stretch. Additionally or alternatively, the second yarn 650 may be an elasticated yarn, such as elastane strand sheathed in polyester fibers; such a yarn may provide an appealing visual aesthetic.

At step 656, the knitting machine prepares to knit the second layer and interior area by transferring stitches of the second yarn 650 (in the second zone 638) from the rear needle bed 633 to opposite needles on the front needle bed 632, where those stitches are parked in order to free the rear needle bed for knitting the second layer and interior area.

At step 660, a fourth feeder corresponding to a fourth yarn 664 may knit at least one full course of the second layer on the rear needle bed across the first, second, and third zones 634, 638, 642. In the second zone 638, the fourth yarn 664 may correspond with the interior area because it is freely separable from the exterior area in that zone as a result of the transfers executed at step 656. Notably, in the second zone 638, the fourth feeder may knit the interior area in half gauge on a single needle bed—in this case, on even needles of the rear bed 633. By skipping odd needles of the rear needle bed 633 when knitting the interior area, courses of the interior area do not interloop with courses of the exterior area. It will be appreciated that step 660 may include a lesser or greater number of courses of the fourth yarn 664, although two courses are illustrated.

At step 668, the knitting machine prepares to resume knitting the exterior area by transferring stitches of the exterior area (i.e., in the second zone 638) previously parked on the front needle bed 632 to odd needles of the rear needle bed 633. Following step 668, the knitting machine may execute steps 646, 656, 660 again if additional knitting height is desired, again utilizing the first, second, and third feeders to knit partial courses of the first yarn 634, second yarn 638, and third yarn 642; then transferring exterior area stitches in the second zone 638 to the front needle bed 632; and then using the fourth feeder to knit full courses of the fourth yarn 664 on the rear needle bed 633. Once the desired knitting height is achieved, loops of the second yarn that were previously transferred to the front needle bed may be transferred to the rear needle bed as in step 668. Following this, step 670 may be executed whereby courses may be knitted on the rear and/or front needle beds to interconnect the first and second layers, e.g., at an interface between the interior and exterior areas. Such interconnection may form an interlayer knit stitch line as described above, and may indicate where the exterior and interior areas are coextensive in a wale-wise dimension.

Figure 16:
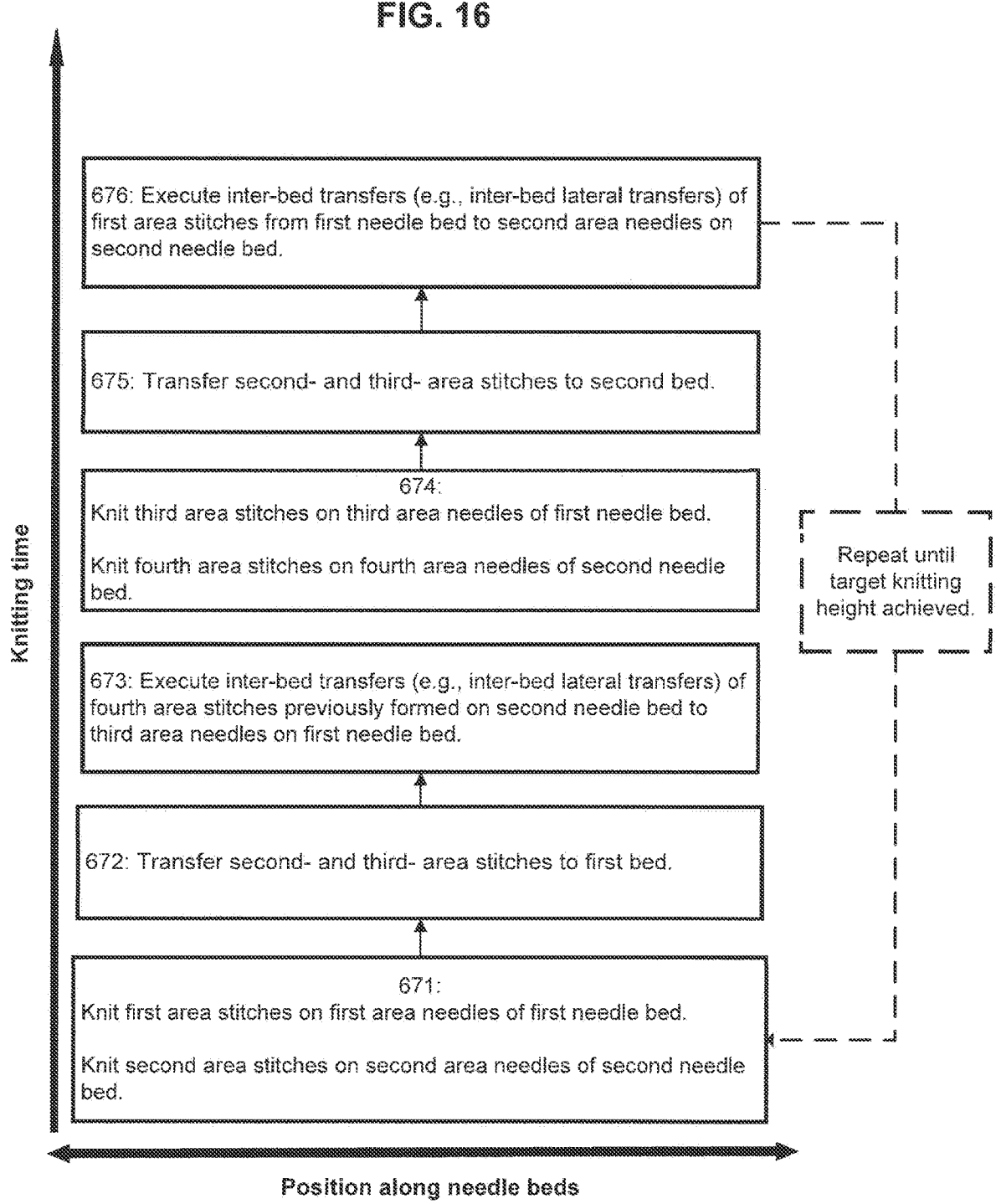
FIG. 16 schematically illustrates additional methods for forming a knitted component.

FIG. 16 schematically depicts exemplary methods of knitting a portion of a knitted component as shown in FIGS. 8, 10 on a knitting machine, e.g., a two needle bed weft knitting machine. In particular, a knitted component may have a first layer having a first area with multi-bed knitted construction, and a second layer having a fourth area with multi-bed knitted construction. The first area may overlap and be freely separable from the fourth area.

Throughout this process, the term first area needles refers to needles on a first needle bed that are utilized for knitting the first area, the term second area needles refers to needles on a second needle bed that are utilized for knitting a second area, the term third area needles refers to needles on the first needle bed that are utilized for knitting a third area, and the term fourth area needles refers to needles on the second needle bed that are utilized for knitting the fourth area. Generally, first- and third-area needles may exist within the same span of the first needle bed, but may generally differ. Likewise, the second- and fourth-area needles may exist within the same span of the second needle bed, but may generally differ.

At step 671, the knitting machine may knit one or more courses of the first area on the first area needles (of the first needle bed), and may also knit one or more courses of the second area on second area needles (of the second needle bed). Thus, step 671 knits two freely-separable single-bed areas.

At step 672, the knitting machine may transfer at least part of the second area knitted on second area needles at step 671 to opposite needles on the first needle bed. In addition, if stitches of the third area reside on the second needle bed at that time (e.g., following earlier transfers not discussed herein), then those third area stitches may be returned to third area needles (on the first needle bed). Thus, following step 672, the first needle bed is prepared to knit courses of the third area, and the second needle bed is prepared to knit courses of the fourth area. Alternatively, the knitting machine is prepared to execute one or more inter-bed transfers.

At step 673, the knitting machine may execute one or more inter-bed transfers of at least one stitch (but not all stitches) of the fourth area to impart multi-bed construction to the fourth area and interconnect the fourth and third areas. For example, an inter-bed transfer may include transferring one or more stitches of the fourth area from the second needle bed to one or more needles on the first needle bed that retain stitches of the third area. Depending on the location of the third area needles relative to the fourth area needles, this step may necessitate an inter-bed lateral transfer, whereby the transfer moves a stitch to a non-opposite needle on another needle bed (for example from a fourth needle on the second bed to the third needle on the first needle bed). By transferring at least one fourth area stitch from the second needle bed to a location(s) on the first needle bed that retains at least one third area stitch, step 671 gives the fourth area a second face of knitted loops or tucks, i.e., imparts multi-bed construction to the fourth area.

At step 674, the knitting machine may knit one or more courses of the third area on the third area needles, and may also knit one or more courses of the fourth area on fourth area needles (of the second needle bed). Thus, step 674 knits single-bed courses of the third and fourth areas, which may be freely separable except where the third and fourth areas are interconnected following step 673.

At step 675, the knitting machine may return stitches of the second area previously parked on the first needle bed to second area needles, and may also transfer stitches of the third area formed on third area needles to the second needle bed. Thus, following step 675, the second needle bed is prepared to knit additional courses of the second area, and the first needle bed is prepared to knit additional courses of the first area. Alternatively, the knitting machine is prepared to execute one or more inter-bed transfers.

At step 676, the knitting machine may execute one or more inter-bed transfers of at least one stitch (but not all stitches) of the first area to impart multi-bed construction to the first area and interconnect the first and second areas. For example, this step may include transferring one or more stitches of the first area from the first needle bed to one or more needles on the second needle bed that retain stitches of the second area. This may necessitate an inter-bed lateral transfer. By transferring at least one first area stitch from the first needle bed to a location on the second needle bed that retains second area stitches, step 676 gives the first area a second face of knitted loops or tucks, i.e., imparts multi-bed construction to the first area.

Following step 676, the knitted component may include two freely-separable, multi-bed areas—one area comprising the first and second areas having multi-bed construction as a result of the inter-bed transfer(s) at step 676, and another area comprising the third and fourth areas having multi-bed construction as a result of the inter-bed transfer(s) at step 673. If additional knitting height is desired, then steps 671-676 may be repeated as necessary.

FIG. 17 illustrates a method of knitting a knitted component as shown in FIGS. 8 and 9, for example a knitted component having four freely separable, less-than-full gauge areas (e.g., one-third gauge). A portion of a front needle bed 677 and a portion of a rear needle bed 678 may each have five needles. A first knitted area including courses of a first yarn 682 may be knitted on a first group of needles, which may correspond to the first and fourth needles on the front needle bed 677, i.e., every third needle of the front needle bed. A second knit area including courses of a second yarn 686 may be knitted on a second group of needles, which may correspond with the second and fifth needles on the rear needle bed 678. A third area including courses of a third yarn 690 may be knitted on a third group of needles, which may correspond to the second and fifth needles on the front needle bed 677. A fourth area including courses of a fourth yarn 694 may be knitted on a fourth group of needles, which may correspond to the third and sixth needle (not shown) of the rear needle bed 678.

At step 698, at least one course of the first area may be knitted on the first group of needles. At step 702, at least one course of the second area may be knitted on the second group of needles. At step 706, stitches of the first area may be transferred to rear bed needles opposite the first group of needles. Following step 706, stitches of the first area knitted at step 698 are parked on the rear needle bed 678, and the front needle bed 677 is free to knit additional areas without interlooping with either of the first or second areas. At step 710, at least one course of the third area may be knitted on the third group of needles (which again, may correspond with empty needles of the front needle bed 677). At step 714, at least one course of the fourth area may be knitted on the fourth group of needles (which may correspond with needles of the rear needle bed 678 not previously utilized to knit other areas or park stitches of other areas). Following step 714, the resulting knitted component may have four freely-separable courses corresponding with the first, second, third, and fourth areas. To achieve additional knitting height, step 718 may be executed to return stitches of the first area previously parked on the rear needle bed to the first group of needles on the front needle bed, and steps 698-714 may be repeated until the desired knitting height is achieved.

FIGS. 18A-D illustrate a method of knitting a knitted component as shown in FIGS. 8, 10, and 16 which is similar to the method of FIG. 17, except that it produces a knitted component having two freely-separable, overlapping, multi-bed areas. A front needle bed 730 and a rear needle bed 734 may each have nine needles. A first knitted area including courses of a first yarn 738 may initially be knitted on a first group of needles, for example the first, fourth, and seventh needles of the front needle bed 730. A second knitted area including courses of a second yarn 742 may initially be knitted on a second group of needles, for example the second, fifth, and eighth needles on the rear needle bed 734. A third knitted area including courses of a third yarn 746 may initially be knitted on a third group of needles, for example the third, sixth, and ninth needles of the front needle bed 730. A fourth knitted area including courses of a fourth yarn 750 may initially be knitted on a fourth group of needles, for example the first, fourth, and seventh needles of the rear needle bed 734.

At step 754, a sequence similar to that shown in FIG. 17 may be carried out. That is, one or more courses of the first area may be knitted on the first group of needles on the front needle bed 730, e.g., in a one-third gauge single jersey knit structure. In addition, one or more courses of the second area may be knitted on the second group of needles on the rear needle bed 734. Then, stitches of the second area may be transferred to opposite needles on the front needle bed 730, while preserving the third, sixth, and ninth needles of the front needle bed 730 as free for knitting the third area, and while freeing the rear needle bed 734 for knitting courses of the fourth area. Then, one or more courses of the third area may be knitted on the third group of needles (on the front needle bed 730) and one or more courses of the fourth area may be knitted on the fourth group of needles (on the rear needle bed 734). Then, stitches of the third area may be transferred to opposite needles on the rear needle bed 734, while preserving the second, fifth, and eighth needles of the rear needle bed for knitting additional courses of the second area, and freeing the front needle bed 730 for knitting additional courses of the first area.

Figure 18A:
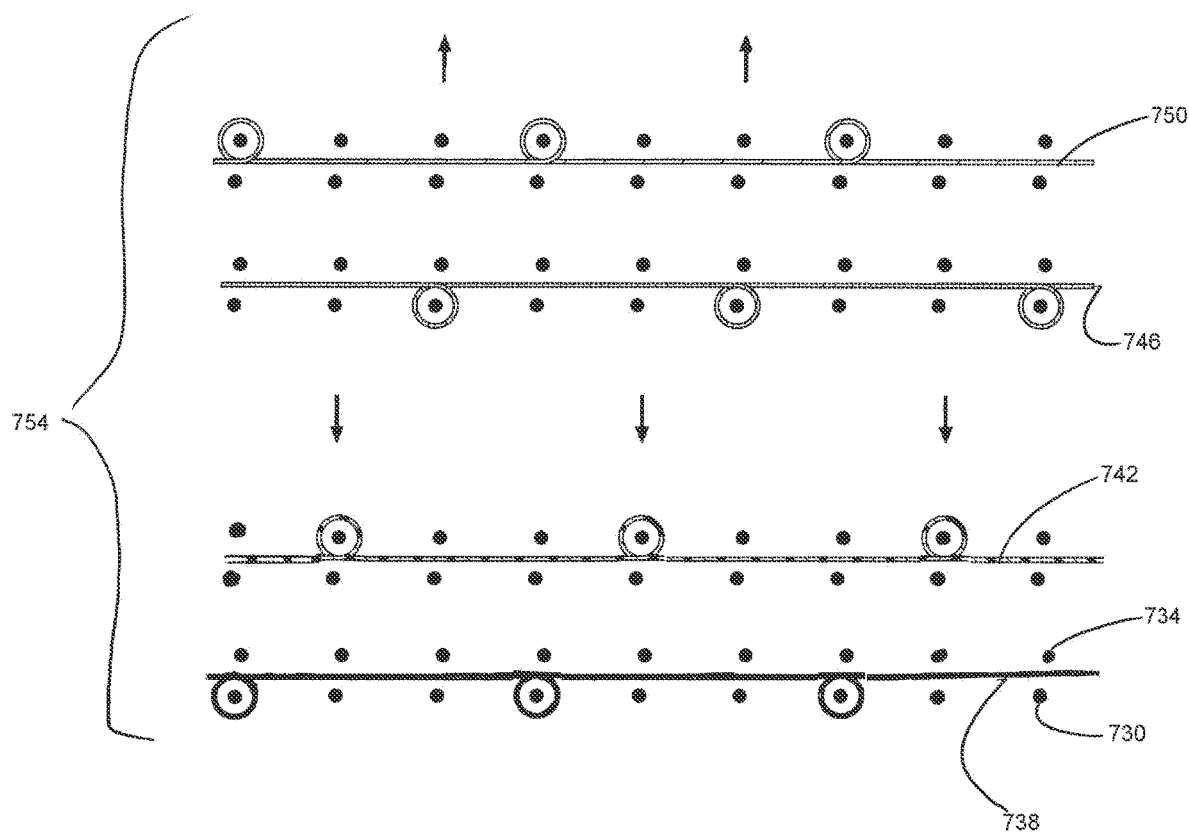
Figure 18B:
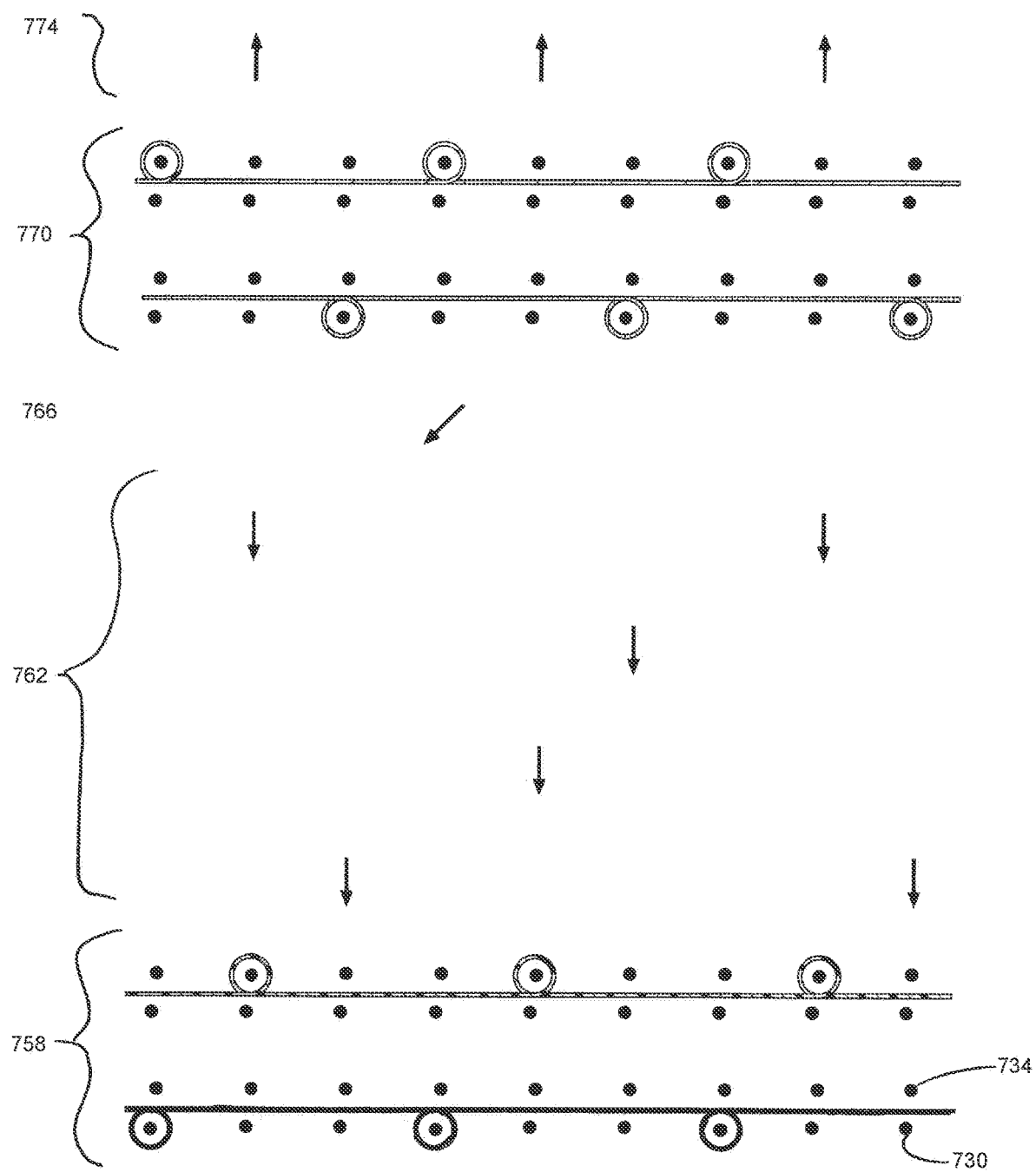

Referring to FIG. 18B, at step 758, one or more courses of the first area may be knitted on the first group of needles on the front needle bed 730, and one or more courses of the second area may be knitted on the second group of needles on the rear needle bed 734.

At step 762, the stitches of the second area knitted on the rear needle bed 734 during step 758 may be transferred to opposite needles on the front needle bed 730. Additionally, stitches of the third area previously transferred to the rear needle bed 734 (e.g., during step 754) may be returned to the front bed 730. Following step 762, substantially all stitches of the first and second areas knitted during the step 758 may be parked on the front needle bed.

At step 766, the machine executes an inter-bed transfer, whereby at least one of the stitches of the fourth area (e.g., knitted during step 754) may be laterally transferred from the rear needle bed 734 to the front needle bed 730—in this case, to a needle on the front needle bed 730 that holds a stitch of the third area. For example, step 766 may transfer a stitch of the fourth area knitted on the fourth needle of the rear needle bed 734 (e.g., during step 754) to the third needle of the front needle bed 730 (which holds a stitch of the third area knitted during step 754). This is one example of an inter-bed transfer—an inter-bed lateral transfer—which may have at least two primary effects. First, it imparts a multi-bed construction to the fourth area, which has two opposite stitch faces following the inter-bed transfer (i.e., one face of knit stitches formed on the rear needle bed 734 and another face of knit stitches located on the front needle bed 730 as a result of the inter-bed lateral transfer). Thus, the inter-bed transfer (such as an inter-bed lateral transfer) may transform a course of yarn originally knitted on a single needle bed and into a multi-bed course. Second, the inter-bed transfer may also place stitches of the third and fourth areas on the same needle, facilitating subsequent interlooping of the third and fourth areas at that location.

At step 770, the knitting machine may knit additional courses of the third and fourth areas on the third and fourth groups of needles, respectively.

At step 774, the knitting machine may return stitches of the second area previously parked on the front needle bed 730 to opposite needles of the rear needle bed 730, and may also transfer stitches of the third area to opposite needles on the rear needle bed 734.

At step 778, the knitting machine may execute at least one inter-bed lateral transfer of one or more stitches of the first area from the front needle bed 730 to the rear needle bed 734—specifically, to a needle on the rear needle bed 734 that holds a stitch of the second area. For example, step 778 may transfer a stitch of the first area knitted on the seventh needle of the front needle bed 730 (e.g., during step 758) to the eighth needle of the rear needle bed 734, which holds a stitch of the second area following step 758. This inter-bed lateral transfer may impart a multi-bed construction to the first area and may also place stitches of the first and second areas on the same needle, thereby facilitating subsequent interlooping of the first and second areas at that location.

Following step 778, the knitted component formed by the foregoing method may include four freely-separable and overlapping knitted areas. As a result of the inter-bed lateral transfers executed at steps 766 and 778, the first area and/or the fourth area may have multi-bed construction, i.e., each of those areas may have at least two opposing loop faces. If additional knitting height is desired, then steps 754-778 may be repeated until the desired knitting height is achieved.

Alternatively, if additional knitting height is desired following step 778, then steps 782814 may be carried out. Steps 782-814 illustrate a similar knitting sequence as shown in steps 754-778: knitting courses of the first and second knitted areas; transferring stitches of the second area (and other areas previously parked on the rear needle bed 734) from the rear needle bed 734 to the front needle bed 730; knitting courses of the third and fourth areas: returning stitches previously parked on the front needle bed 730 to the rear needle bed 734; executing at least one inter-bed lateral transfer to impart multi-bed knit construction to one of the layers; knitting additional courses of the first and second knitted areas; transferring stitches of the second knitted area (and other areas previously parked on the rear needle bed) from the rear needle bed 734 to the front needle bed 730; executing at least one inter-bed lateral transfer to impart multi-bed knit construction to one of the layers; and knitting additional courses of the third and fourth knitted areas.

Figure 19:
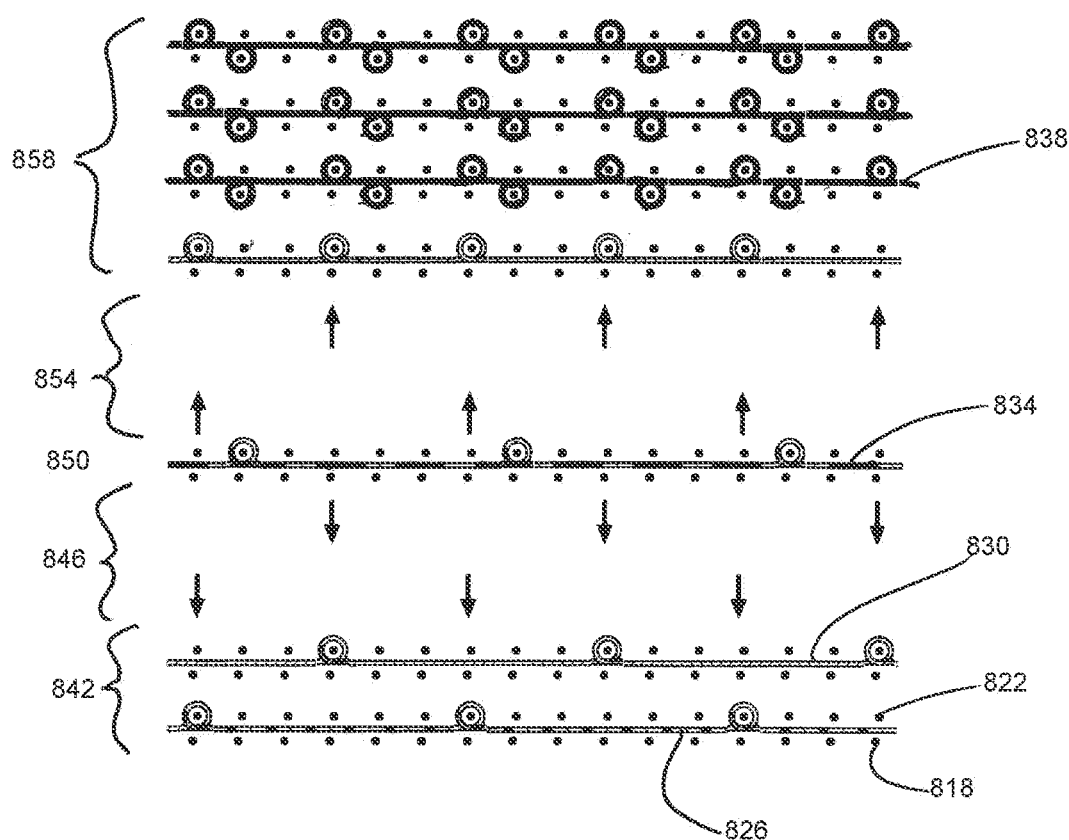
FIG. 19 depicts a knitting diagram corresponding with another zone of the knitted component of FIG. 8.

FIG. 19 illustrates a method of knitting a knitted component as shown in FIGS. 8 and 11, in particular a knitted component having a multi-bed first area and an overlapping, freely-separable second area having single bed construction. The first area and second area may correspond with a vamp zone and an underfoot zone, respectively, although it shall be understood that the first and second areas may correspond with different zones of a knitted component. For illustration purposes, a front needle bed 818 and a rear needle bed 822 may each have sixteen needles. The first area may include courses of a first yarn 826, a second yarn 830, and a fourth yarn 838. The second area may include courses of a third yarn 834. Any of the first, second, third, and fourth yarns 826, 830, 834, and 838 may be selected to impart particular properties to the knitted component, and therefore may be similar or different from each other.

At step 842, one or more courses of the first yarn 826 may be knitted on the rear needle bed 822, e.g., on the first, seventh, and thirteenth needles, and one or more courses of the second yarn 830 may be knitted on different needles of the rear needle bed 822, e.g., the fourth, tenth, and sixteenth needles.

At step 846, stitches of the first and second yarns 826, 830 knitted during step 842 may be transferred to opposite needles of a front needle bed 818, thereby freeing the rear needle bed 822 for knitting of the second area.

At step 850, one or more courses of the third yarn 834 (which make up at least part of the second area) may be knitted on needles of the rear needle bed 822 where the yarns of the first area are not knitted, e.g., the second, eighth, and fourteenth needles.

At step 854, stitches of the first and second yarns 826, 830 previously transferred to the front needle bed 818 during the second step may be returned to the rear needle bed 822, in preparation for knitting of additional courses of the first, second, and/or fourth yarns 826, 830, 838.

At step 858, one or more courses of the second yarn 830 may be knitted on the rear needle bed 822, including on needles holding stitches of the first yarn 818. Thus, as a result of step 858, courses of the first and second yarns make become interlooped, and thus inseparable at those locations. Additionally, one or more courses of the fourth yarn 838 may be knitted on needles of both the front and rear needle beds 818, 822 where courses of the first area are located (e.g., where stitches of the first and second yarns 826, 830 are located), yet also where stitches of the second area (i.e., the third yarn 834) are not located. For example, the fourth yarn 838 may be knitted in less-than-full gauge double jersey on any front bed needles and on any rear bed needles except the second, eighth, and fourteenth needles (on which the third yarn was knitted during the third step). Thus, as a result of step 858, the second area may have multi-bed knit construction, yet may remain freely separable from the first area.

If additional knitting height it desired following step 858, then steps 842, 846, 850, 854, and 858 may be repeated until the desired knitting height is achieved. For example, stitches of the fourth yarn 838 knitted during step 858 may be transferred to the front needle bed (as in step 846), additional courses of the third yarn 834 may be knitted on the rear needle bed 822 (as in step 850), stitches of the first, second, and fourth yarns 826, 830, 838 may be returned to the rear needle bed 822 (as in step 854), and additional courses of the first, second, and fourth yarns 826, 830, 838 may be knitted. If no additional knitting height is desired however, the foregoing method will have produced a knitted component including a first area including multi-bed courses of the fourth yarn 838 in addition to courses of the first and second yarns 826, 830, and also including a freely separable second area comprising single-bed courses of the third yarn 834.

In summary, each of the foregoing knitted component may include at least two or more freely separable and overlapping knitted areas formed directly as a result of a knitting process, at least one of which area has multi-bed knitted construction. Multi-bed knitted construction may advantageously impart greater strength, stretch resistance, durability, cushioning, or other property to the knitted component. Because such knitted areas may be integrally formed in a single knitting process, the foregoing knitting methods may advantageously reduce production time and cost.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

What is claimed is:

1. A knitted component for an upper for an article of footwear, the knitted component comprising:
   a first knitted layer;
   a second knitted layer at least partially overlapping the first knitted layer;
   an interlooped area comprising the first knitted layer interlooped with the second knitted layer; and
   a knitted loop structure that is adjacent to the interlooped area and that comprises the first knitted layer freely separable from the second knitted layer to comprise a passageway, wherein:
   the first knitted layer comprises a first edge comprising a first opening of the passageway and a second edge comprising a second opening of the passageway;
   the first edge and the second edge extend in a course-wise direction; and
   the passageway extends, between the first opening and the second opening, in a wale-wise direction.

2. The knitted component of claim 1, wherein the knitted loop structure comprises at least a portion of a fastening system for the upper.

3. The knitted component of claim 2, wherein the knitted loop structure is configured to receive a lace.

4. The knitted component of claim 1, wherein the first knitted layer and the second knitted layer form at least part of a throat region of the knitted component.

5. The knitted component of claim 4, wherein the knitted loop structure is located within the throat region of the knitted component.

6. The knitted component of claim 5, further comprising additional knitted loop structures within the throat region of the knitted component.

7. The knitted component of claim 1, wherein the second knitted layer forms at least part of an interior surface of the upper and comprises a yarn comprising elastic material.

8. The knitted component of claim 1, wherein the first knitted layer includes a first binding area at the first edge and a second binding area at the second edge, the first binding area and the second binding area being formed from one or more courses of a yarn having a high stretch resistance and/or high tenacity.

9. The knitted component of claim 1, wherein the first knitted layer includes a first binding area at the first edge and a second binding area at the second edge, the first binding area and the second binding area being formed from one or more courses of yarn comprising a thermoplastic material.

10. The knitted component of claim 1, further comprising an interlayer knit stitch located where at least one yarn of the first knitted layer interloops with at least one yarn of the second knitted layer.

11. The knitted component of claim 10, wherein a first group of interlayer knit stitches are formed along a first side of the passageway between the first and second edges, and a second group of interlayer knit stitches are formed along a second side of the passageway between the first and second edges.

12. The knitted component of claim 11, wherein the first knitted layer and the second knitted layer are freely separable on a first side of the first and second groups of interlayer knit stitches, and the first knitted layer and the second knitted layer are inseparable on a second side of the first and second groups of interlayer knit stitches.

13. The knitted component of claim 1, wherein, at least at the knitted loop structure, one of the first knitted layer and the second knitted layer have a multi-bed knit structure.

14. The knitted component of claim 13, wherein the first knitted layer forms at least part of an exterior surface of the upper and has the multi-bed knit structure at the knitted loop structure.

15. An upper for an article of footwear, the upper comprising:
- a knitted component having an integral one-piece knitted construction, the knitted component comprising:
- a knitted loop structure for a fastening system of the upper, the knitted loop structure comprising a first knitted layer and a second knitted layer that at least partially overlaps the first knitted layer,
- wherein the knitted loop structure includes a passageway in which the first knitted layer and the second knitted layer are freely separable, and, in an area adjacent to the knitted loop structure, the first knitted layer and the second knitted layer are connected by interloping of at least one yarn of the first knitted layer with at least one yarn of the second knitted layer,
- wherein the passageway of the knitted loop structure extends between a first opening defined at least partially by a first edge of the first knitted layer and a second opening defined at least partially by a second edge of the second knitted layer, the first edge and the second edge each extending in a course-wise direction, and
- wherein the passageway extends in a wale-wise direction between the first opening and the second opening.

16. The upper of claim 15, wherein the knitted loop structure is configured to receive a lace.

17. The upper of claim 16, wherein the knitted loop structure and the lace form a part of a fastening system to secure a wearer's foot within a void formed by the knitted component.

18. The upper of claim 15, wherein at least at the knitted loop structure, one of the first knitted layer and the second knitted layer have a multi-bed knit structure.

19. The upper of claim 15, further comprising a second knitted loop structure having a passageway extending in a direction different from the wale-wise direction.

20. The upper of claim 15, wherein the knitted loop structure comprises a monofilament yarn and/or a yarn comprising a thermoplastic material.

* * * * *

UNITED STATES PATENT AND TRADEMARK OFFICE
CERTIFICATE OF CORRECTION

| | | |
|---|---|---|
| PATENT NO. | : 12,129,578 B2 | Page 1 of 1 |
| APPLICATION NO. | : 18/457913 | |
| DATED | : October 29, 2024 | |
| INVENTOR(S) | : Juan L. Aceves Tinajero et al. | |

It is certified that error appears in the above-identified patent and that said Letters Patent is hereby corrected as shown below:

On the Title Page

At Item (72) Inventor, Line no. 1 should read:
Juan L. Aceves

In the Specification

Under Column no. 15, Line no. 23 should read:
each other. Like

Signed and Sealed this
Eighteenth Day of February, 2025

Coke Morgan Stewart
*Acting Director of the United States Patent and Trademark Office*